US010768114B2

(12) United States Patent
Franjic et al.

(10) Patent No.: US 10,768,114 B2
(45) Date of Patent: Sep. 8, 2020

(54) MULTI-MODAL OPTICAL IMAGING SYSTEM FOR TISSUE ANALYSIS

(71) Applicant: SYNAPTIVE MEDICAL (BARBADOS) INC., Bridgetown (BB)

(72) Inventors: Kresimir Franjic, Toronto (CA); Siu Wai Jacky Mak, Toronto (CA); Kai Michael Hynna, Toronto (CA); Michael Frank Gunter Wood, Toronto (CA); Piotr Kuchnio, Toronto (CA); Yusuf Bismilla, Toronto (CA); Lachlan Noel Holmes, Toronto (CA); Stewart Bright, Toronto (CA); Aaron Yu Lai Cheung, Toronto (CA); Yuri Alexander Kuzyk, Toronto (CA); Aryeh Benjamin Taub, Toronto (CA); Sanaz Rezaei, Toronto (CA)

(73) Assignee: Synaptive Medical (Barbados) Inc., Bridgetown (BB)

( * ) Notice: Subject to any disclaimer, the term of this patent is extended or adjusted under 35 U.S.C. 154(b) by 0 days.

(21) Appl. No.: 15/501,727

(22) PCT Filed: Apr. 29, 2016

(86) PCT No.: PCT/CA2016/050502
§ 371 (c)(1),
(2) Date: Feb. 3, 2017

(87) PCT Pub. No.: WO2017/185161
PCT Pub. Date: Nov. 2, 2017

(65) Prior Publication Data
US 2018/0180550 A1 Jun. 28, 2018

(51) Int. Cl.
*G01N 21/65* (2006.01)
*G01B 11/24* (2006.01)
(Continued)

(52) U.S. Cl.
CPC ......... *G01N 21/65* (2013.01); *G01B 9/02091* (2013.01); *G01B 11/24* (2013.01);
(Continued)

(58) Field of Classification Search
CPC .......... G01B 11/14; G01B 11/02; G01B 11/04
See application file for complete search history.

(56) References Cited

U.S. PATENT DOCUMENTS 5,822,063 A * 10/1998 Suzuki ................... G01N 21/21
356/364
6,485,413 B1 * 11/2002 Boppart ............. A61B 1/00096
356/450
(Continued)

FOREIGN PATENT DOCUMENTS

| CA | 2423552 A1 | 4/2002 |
| CA | 2478334 A1 | 9/2003 |

OTHER PUBLICATIONS

Dubois, Arnaud, et al. "Ultrahigh-resolution OCT using white-light interference microscopy." Coherence Domain Optical Methods and Optical Coherence Tomography in Biomedicine VII. vol. 4956. International Society for Optics and Photonics, 2003.*
(Continued)

*Primary Examiner* — Maurice C Smith
(74) *Attorney, Agent, or Firm* — Thanh V. Vuong

(57) ABSTRACT

A modular system for organic sample analysis is disclosed which includes a sample stage including a support platform and a motorized positioning mechanism mounted on the support platform, and a sample holder mounted on the motorized positioning mechanism upon which a sample is placed. A probe support rack is mounted on the support platform and two or more bio-imaging probes mounted on the probe support and arranged in a pre-defined geometry with respect to each other, and at least one bio-imaging probe has a field of view independent of all other bio-
(Continued)

imaging probes. The system includes a computer controller connected to the motorized positioning mechanism and the two or more bio-imaging probes. The computer is programmed for controlling motorized positioning mechanism to move the sample holder having the sample located thereon to positions in the field of view of each bio-imaging probe where the sample can be analyzed individually by each of the bio-imaging probes. The computer includes a storage medium for storing an imaging data from each bio-imaging probe. The computer is programmed for spatially correlating imaging data of the selected volume of interest with the imaging data obtained from at least one other bio-imaging probe and storing the spatially correlated imaging data in the computer storage medium.

31 Claims, 15 Drawing Sheets

(51) Int. Cl.
*G01N 21/47* (2006.01)
*G01N 21/63* (2006.01)
*G01N 21/64* (2006.01)
*G01N 21/31* (2006.01)
*G01B 9/02* (2006.01)
*G01N 21/35* (2014.01)

(52) U.S. Cl.
CPC ............. *G01N 21/31* (2013.01); *G01N 21/35* (2013.01); *G01N 21/474* (2013.01); *G01N 21/4795* (2013.01); *G01N 21/636* (2013.01); *G01N 21/6408* (2013.01); *G01N 21/6456* (2013.01); *G01N 21/6486* (2013.01); *G01N 2021/653* (2013.01); *G01N 2021/655* (2013.01)

(56) References Cited

U.S. PATENT DOCUMENTS

| | | | |
|---|---|---|---|
| 7,750,315 B2* | 7/2010 | Eustergerling | A61B 5/0059 250/458.1 |
| 8,553,219 B2 | 10/2013 | Patil et al. | |
| 2004/0008409 A1* | 1/2004 | Chih | G01B 9/04 359/392 |
| 2007/0058171 A1* | 3/2007 | Berg | G01N 21/474 356/446 |
| 2007/0222460 A1* | 9/2007 | Price | C25D 11/02 324/644 |
| 2009/0298703 A1* | 12/2009 | Gough | G06T 7/0012 506/8 |
| 2010/0189339 A1* | 7/2010 | Amanullah | G01N 21/8806 382/145 |
| 2010/0241396 A1* | 9/2010 | Rodenburg | A61B 6/483 702/167 |
| 2011/0059016 A1 | 3/2011 | Ramanujam et al. | |
| 2013/0027515 A1* | 1/2013 | Vinther | A61B 1/00177 348/44 |
| 2013/0188857 A1* | 7/2013 | Yoshihara | G01N 33/574 382/133 |
| 2016/0313252 A1 | 10/2016 | Rachet et al. | |

OTHER PUBLICATIONS

Patil et al., "Integrated system for combined Raman spectroscopy-spectral domain optical coherence tomography", Journal of Biomedical Optics 16(1), 011007 (Jan. 2011).
International Search Report from PCT/CA2016/050502 dated Jan. 11, 2017.
Written Opinion from PCT/CA2016/050502 dated Jan. 11, 2017.

* cited by examiner

MULTI-MODAL OPTICAL IMAGING SYSTEM FOR TISSUE ANALYSIS

FIELD

The present disclosure relates to a biopsy analysis system that can be placed in an operating room to provide rapid tissue analysis.

BACKGROUND

During a surgical procedure, there is a need for intra-operative pathology consultation to guide immediate surgical decisions such as establishing or confirming a diagnosis; or delineating margins of diseases. These pathological assessments are vital for successful surgical outcomes. Yet, typical intra-operative pathology procedures are time-consuming since tissue biopsy samples have to be transferred to a pathology lab where they have to be correctly prepared and analyzed following which the results need to be adequately communicated to a remote operating room. This long process may cause discontinuities in surgical workflows and delays in surgical actions. Under ideal circumstances, it typically takes approximately 20 minutes to perform a biopsy analysis. However, this interval is usually longer during a surgery and waiting times of more than 60 minutes are not unusual for a variety of reasons. Reasons for delays may include a large distance between the operating room and the pathology lab, limited capacity of the pathology lab to analyze the biopsy sample(s), or inefficient setup of the pathology equipment.

Accordingly, it would be beneficial to provide a biopsy analysis system that can be placed in an operating room, easily operated, and which can provide fast and reliable relevant pathological assessments.

Further, various types of optical imaging can provide information about tissue disease states. Examples of such optical imaging modalities include optical coherence tomography (OCT), incoherent Raman spectroscopy, coherent Raman spectroscopy, auto-florescence intensity imaging, fluorescence lifetime imaging, diffuse optical imaging, confocal microscopy, super-resolution microscopy, second harmonic imaging microscopy, third harmonic imaging microscopy, dark field imaging, phase-contrast microscopy, and white light imaging (e.g. traditional microscopy).

The imaging information can be further improved by injecting imaging contrast agents into an examined tissue. It has also been realized that insights about a tissue can be enhanced if the tissue is probed with several optical imaging modalities and the data from different imaging modalities are correlated. The reason for the success of such multi-modal imaging approaches is that these optical imaging techniques examine different tissue properties, so they are complimentary in nature. Several embodiments of multi-modal optical imaging systems have been reported in academic literature such as the reference Egodage, Kokila, et al. "The combination of optical coherence tomography and Raman spectroscopy for tissue characterization." Journal of Biomedical Photonics & Engineering 1.2 (2015): 169-177, and disclosed in patents DE19854292C2, U.S. Pat. No. 6,507,747B1, U.S. Pat. No. 7,508,524B2, which are herein incorporated by reference.

A shared feature of all the reported multi-modal optical systems for tissue imaging is that their optical sub-systems related to individual imaging modalities (e.g. OCT, Raman spectroscopy, fluorescence spectroscopy, etc.) share a certain number of optical elements such as optical beam splitters, lenses, or mirrors. Such design approach has its advantages since it leads to compact optical systems. However, there is also a potential disadvantage since the performance of individual imaging modalities is usually sub-optimal since the choice of the characteristics of shared optical elements is a compromise between different requirements for individual imaging sub-systems. For example, in Raman spectroscopy, signals are very weak compared to background and the pump laser power, so optical elements with sharp optical filtering characteristics are required. However, such optical filtering characteristics may not be optimal for other imaging modalities for which excitation and signal spectra may partially overlap with the Raman ones.

An optical multi-modal imaging platform in which various optical imaging modalities don't share common optical elements may provide individual optical imaging data with better quality and thus improve overall information content of the multi-modal imaging process.

SUMMARY

The present disclosure discloses a portable optical system comprising of plurality of optical probes and which is used for analyzing tissue samples especially in the context of biopsy analysis and bio-medical research.

In an embodiment there is provided a modular system for organic sample analysis is disclosed which includes a sample stage including a support platform and a motorized positioning mechanism mounted on the support platform, and a sample holder mounted on the motorized positioning mechanism upon which a sample is placed. A probe support rack is mounted on the support platform and two or more bio-imaging probes mounted on the probe support and arranged in a pre-defined geometry with respect to each other, and at least one bio-imaging probe hays a field of view independent of all other bio-imaging probes. The system includes a computer controller connected to the motorized positioning mechanism and the two or more bio-imaging probes. The computer is programmed for controlling motorized positioning mechanism to move the sample holder having the sample located thereon to positions in the field of view of each bio-imaging probe where the sample can be analyzed individually by each of the bio-imaging probes. The computer includes a storage medium for storing an imaging data from each bio-imaging probe. The computer is programmed for spatially correlating imaging data of the selected volume of interest with the imaging data obtained from at least one other bio-imaging probe and storing the spatially correlated imaging data in the computer storage medium.

In an embodiment there is provided a method under computer control of organic sample analysis, which includes, a) in any order:
  i) affixing two or more bio-imaging probes to a probe support rack which is mounted on a support platform, said two or more bio-imaging probes being mounted in a pre-defined geometry with respect to each other and at least one bio-imaging probe having a field of view independent of all other bio-imaging probes, and
  ii) placing an organic sample on a sample holder, the sample holder being mounted on a motorized positioning mechanism; and b) initiating a computer controller connected to said motorized positioning mechanism and the two or more bio-imaging probes for instructing the motorized positioning mechanism to move the sample holder having the sample located thereon to positions in the field of view of selected bio-imaging probes where the sample is analyzed individually by each of the bio-imaging probes, storing imaging data from each of the bio-imaging probe, and spatially correlating imaging data of the selected volume of interest with the imaging data obtained from at least one other bio-imaging probe and storing said spatially correlated imaging data in said storage means.

A further understanding of the functional and advantageous aspects of the present disclosure can be realized by reference to the following detailed description and drawings.

BRIEF DESCRIPTION OF THE DRAWINGS

Embodiments disclosed herein will be more fully understood from the following detailed description thereof taken in connection with the accompanying drawings, which form a part of this application, and in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

As used herein, the term "patient" is not limited to human patients and may mean any organic sample such as human tissue, animal tissue, plant tissue, cells, and food samples.

As used herein, the term "bio-imaging probe" includes probes that acquire signals from visible, ultraviolet, infrared, terahertz, X-rays, microwave, and radio frequency part of the electromagnetic spectrum as well as acoustic probes.

The imaging probes can be zero dimension (i.e., single point), 1 dimension (1D), 2 dimensions (2D), 3 dimensions (3D) or 4 dimensions (4D).

Figure 1:
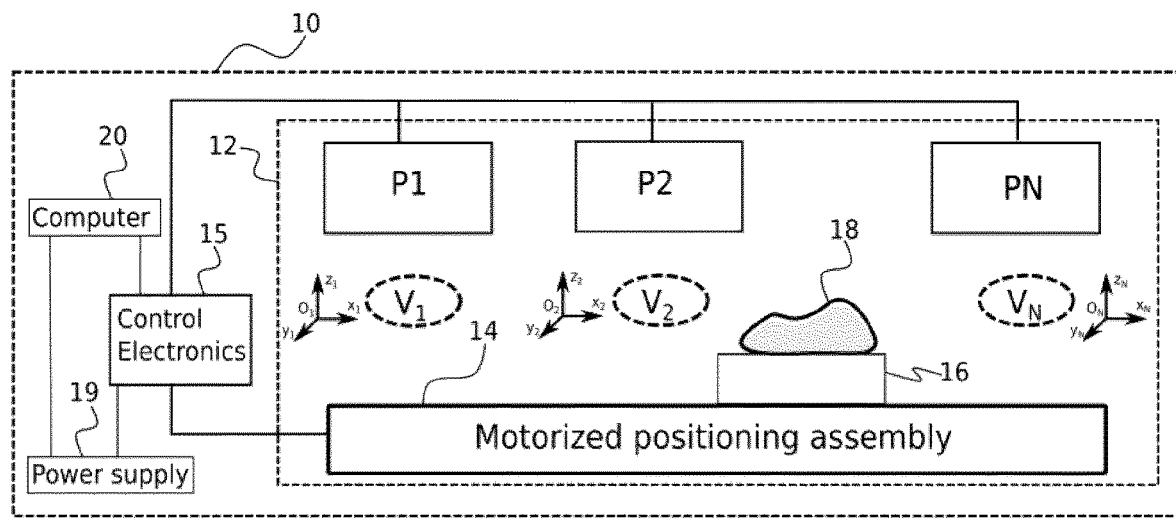
FIG. 1 shows a schematic representation of a portable multi-modal tissue imaging system constructed in accordance with the present disclosure.

FIG. 1 shows a schematic view of a portable biopsy system 10 which includes plurality of optical probes P1, P2, ..., PN arranged in a fixed geometry relative to each other; a motorized positioning assembly 14; a sample holder 16 attached to the motorized positioning assembly 14 on which a sample 18 is mounted; control electronics 15 that drives the motorized positioning assembly 14 and the optical probes P1, P2, ..., PN; a computer (microprocessor) controller 20 that controls the control electronics and which is programmed with instructions to acquire and store data from these optical probes; power supply 19 that provides appropriate power for control electronics 15 and computer 20.

The contents of biopsy system 10, or, at least, the optical probes P1, P2, ..., PN and motorized positioning assembly 14 may be enclosed within a light-tight enclosure 12 to prevent any ambient light from contaminating the optical signals detected by any one or combination of the sensitive optical probes P1 to PN.

The contents of biopsy system 10, or, at least, the optical probes P1, P2, ..., PN and motorized positioning assembly 14 may be mounted on a vibrationally damped base to prevent mechanical vibrations which may cause noise in the optical signals.

The housing enclosing all the components forming part of biopsy system 10 may include a ventilation system to prevent deterioration of sensitive biological samples due to the presence of any air contamination inside the light tight enclosure. Air contamination can be detrimental if long-term sample preservation is required due to the need for an extended period to do the tissue analysis. Similarly, system 10 may include a sample cooling system provided to slow the deterioration of some biological samples by being able to cool them below room temperature. A non-limiting exemplary cooling system may include a thermoelectric cooling (TEC) system within sample holder 16.

For each probe Pi among probes P1, P2, . . . , PN, there is a probe imaging volume Vi that is stationary relative to probe Pi and which defines the region of space that can be probed with probe Pi. Also, for each probe imaging volume Vi there is a coordinate system CSi which is fixed relative to probe Pi and which defines the coordinates of the points within the given probe imaging volume Vi. In the remaining text, it will be assumed without loss of generality that the coordinate systems CSi are Cartesian coordinate systems with axes xi, yi, zi. If alternative coordinate systems, such as cylindrical or spherical coordinate systems, are used, they can be transformed to Cartesian coordinate systems through coordinate transformations known to a person as having ordinary skill in the art.

Figure 2:
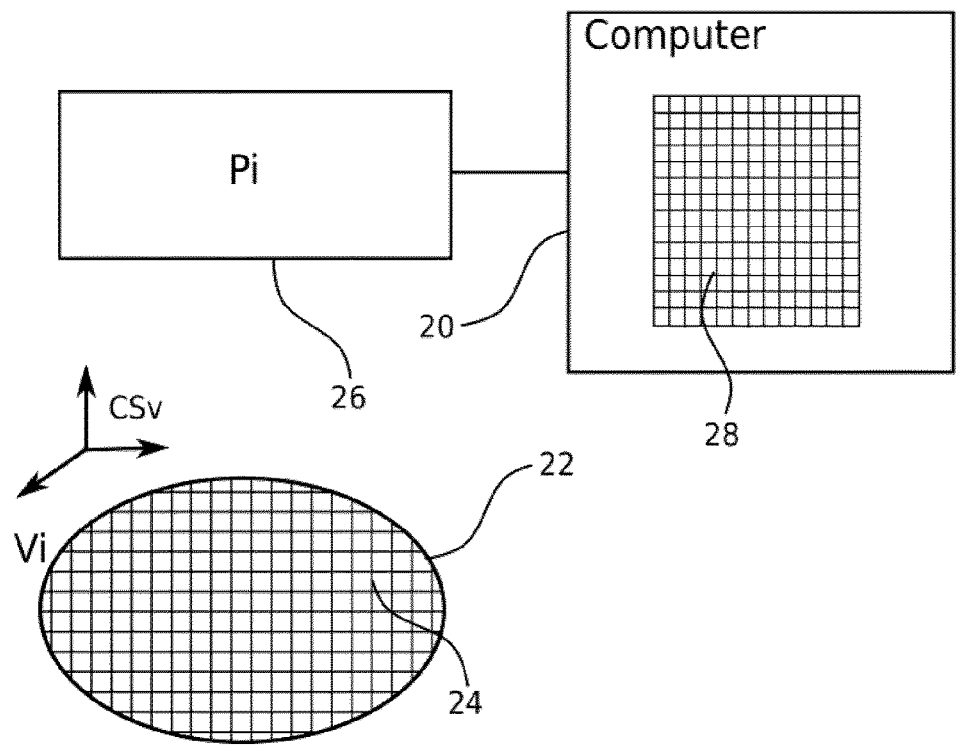
FIG. 2 shows a schematic of probe imaging volume discretization and its representation in the control computer system.

As shown in FIG. 2, each probe imaging volume Vi 22 is divided into a virtual spatial array of sampling discrete cells 24. The minimum useful size of the discrete cells 24 is determined by the imaging resolution of corresponding probe Pi 26. The dimension Ns of the spatial array 24 can be 0, 1, 2, 3, depending on the type of probe Pi. For example, spatial arrays related to simple point base probes (such as Raman probes with static laser excitation beams) are zero-dimensional (scalars), while those related to OCT probes are three-dimensional (3D). Also, for a probe with any spatial array dimension, it is possible to record an additional time coordinate indicating the moment when the imaging measurement takes place at a specific discrete cell. Recording time coordinates can be useful in case when dynamic phenomena are observed in a sample. The spatial array 24 is mapped into a data array 28 in the memory storage device of the computer controller 20 such that data array 28 has at least a dimension Ns+1 where its Ns dimensions correspond to Ns dimensions of spatial array 24 while additional >Ns dimensions are related to imaging data acquired in a particular discrete cell of spatial array 24. The number and size of additional >Ns dimensions correspond to the number of data types acquired in individual discrete cells.

For computational convenience, the informational content of data arrays 28 can be represented by a set of several data arrays with smaller dimensions and size. Such data array representations will be known to persons having ordinary skill in the art; so, hereinafter it will be assumed that the spatial array is mapped into a single data array with dimension (Ns+1).

For each set of coordinates xi, yi, zi in physical coordinate system CSi, there are unique coordinates of data array 28 along Ns dimensions and a vector of imaging data along the (Ns+1)-th dimension where imaging data are acquired from the discrete spatial cell overlapping with xi, yi, zi coordinates. Using data from data array 28, it is possible to assign values of imaging data to any point with coordinates xi, yi, zi using interpolation methods that will be known to those of ordinary skill in the art. Imaging data from a particular discrete cell of spatial array 24 is mapped to a corresponding element of data array 28 by controlling the position of the volume element being excited by the excitation optical signal of probe Pi.

For example, in case when detector of probe Pi is an array element whose dimension is equal to the dimension of spatial array 24 (as in case of white light imaging with a CCD camera), such excitation position control can be accomplished by simple switching on/of the excitation source such that all cells of spatial array 24 will be imaged and mapped to data array 28 simultaneously.

Another example is with scanning optical probes (such as OCT) where the optical probe Pi contains an optical scanner controlled by computer 20 and where the position of optical scanner mirrors dictate the position of the excitation laser beam and thus the position of the excitation volume. To simplify further discussion, we will relate imaging data to physical coordinate system CSi and continuous coordinates xi, yi, zi assuming tacitly that all data and positions are recorded and processed in computer controller/processor 20 in the form of discrete data arrays.

During a probe registration process, coordinate transformation equations are established that relate coordinates xi, yi, zi of each probe imaging volume Vi to the corresponding Cartesian coordinates of all other probe imaging volumes V1, V2, . . . VN. These coordinate transformation equations are recorded and stored by the computer 20.

A few practical and non-limiting embodiments for such optical probe registration processes are described here below. The optical probe registration process can be performed only occasionally assuming the optical probes P1, P2, . . . , PN remain fixed at their positions relative to each other.

Figure 3:
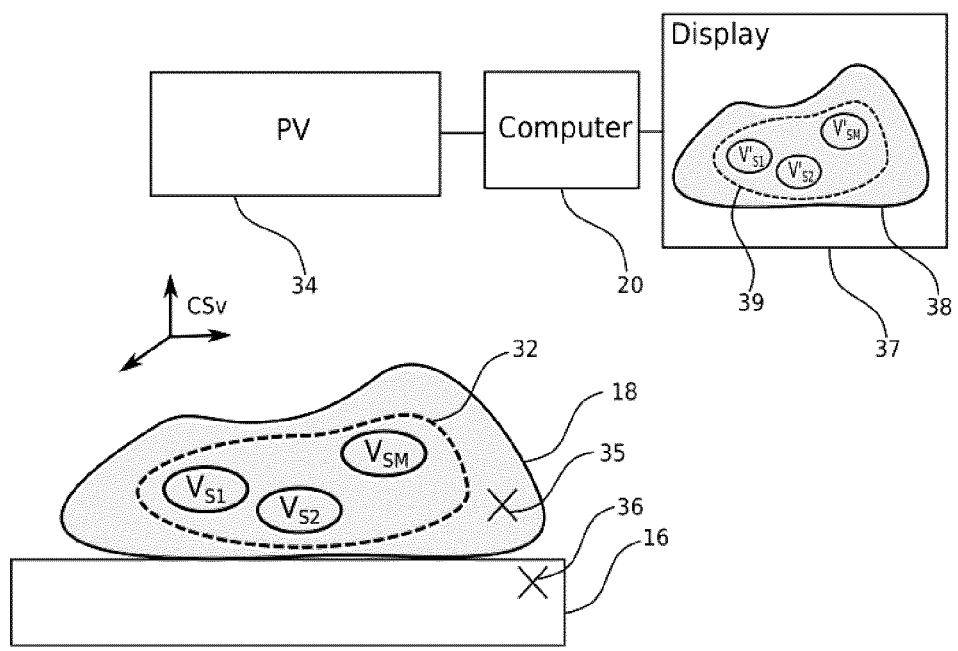
FIG. 3 is a side elevation view of a tissue sample with highlighted sample sections of interest VS1, VS2, ..., VSM selected after the sample has been observed with an optical probe.

Also, at least one designated probe PV (shown in FIG. 3) of the probes P1, P2, . . . , PN is configured to provide a user with the ability to mark sample volumes of interest Vs1, Vs2, . . . , VsM observed on an image of the sample 18 created by the probe PV. As shown in FIG. 3, a sample 18 which is positioned on sample holder 16 is imaged with the probe PV 34 which is controlled by computer 20. The image 38 of sample 18 is shown on a computer display 37 where a user can mark a set 39 of images of sample sections of interest Vs1', Vs2', . . . , VsM' which correspond to a set 32 of sample sections of interest Vs1, Vs2, . . . , VsM in physical space. The process of marking set 39 on display 37 can be done by using computer user interface techniques and user interface devices which will be known to those having ordinary skill in the art. An example of a user interface technique may include a graphical user interface (GUI) and examples of user interfaces devices may include a computer monitor, a touchscreen display, and a mobile device such as a phone or tablet.

The positions of Vs1, Vs2, . . . , VsM are recorded by the computer 20 and they can be specified in physical coordinates xi, yi, zi related to designated probe PV or equivalently in the coordinates of the corresponding data array. For the purpose of this disclosure, the process of marking and recording sample sections of interest Vs1, Vs2, . . . , VsM is called sampling volume definition. A few practical and non-limiting embodiments for such sampling volume definition are described here below.

During the process of sampling volume definition it is also beneficial to mark and record a tissue landmark 35 as a fiducial marker for establishing spatial correlations between imaging data acquired by the multi-modal optical imaging system and other previous or subsequent imaging and analysis modalities such as MRI or histological analysis. Alternatively, a fiducial marker 36 can be located on sample holder 16 if the sample remains rigidly attached to sample holder 16 for the above mentioned previous or subsequent alternative imaging procedures.

In a sample analysis process, sample 18 is attached to sample holder 16 which in turn is attached to the motorized positioning assembly 14. This allows the operator to position of sample 18 under various optical probes P1, P2, . . . , PN to perform optical imaging. In case the spatial orientation of sample 18 relative to the optical probes P1, P2, . . . , PN is fixed and only translations of sample 18 using motorized positioning assembly 14 are performed, the shape of sample 18 remains approximately the same during the sample movements. Since sample sections of interest Vs1, Vs2, . . . , VsM are defined within the coordinate system CSv; and since the coordinates of the coordinate system CSv are correlated to coordinates of all other coordinate systems CSi through the probe registration process, it is possible to completely or partially overlap the sample sections of interest Vs1, Vs2, . . . , VsM with volume Vi of each probe Pi and specify locations of these sections by using coordinates of the local coordinate system CSi. Thus, it is possible to spatially correlate imaging data obtained across the sections Vs1, Vs2, . . . , VsM by using probe Pi to imaging data acquired across these sections by using any other probe Pj. These data can be recorded, stored and possibly analyzed by computer 20.

The spatial data correlation process described above is performed under the assumption that sample 18 does not change its orientation relative to the optical probes. However, in case of a large soft tissue sample and sample tilting during the positioning under probes P1, P2, . . . , PN, the sample shape and position may slightly change due to the force of gravity so consequently relative positions of two sample features within a sample section of interest Vsj may change when the sample section of interest Vsj is analyzed under a probe Pi. If this relative change of feature position is larger than the required imaging resolution for the probe Pi, it is necessary to create correction coordinate transformation equations that relate initial relative positions of these two features to the final ones in order to spatially correlate optical data for these two features acquired with the probe Pi to the data acquired by other probes P1, P2, . . . , PN. Creating such correlations of relative positions of tissue features when the tissue undergoes some kind of deformation will be well known to those of ordinary skill in the art. An example can be found in the reference Suwelack, Stefan, et al. "Physics-based shape matching for intraoperative image guidance." *Medical physics* 41.11 (2014): 111901, which is incorporated herein by reference in its entirety.

Motorized Positioning Assembly

The motorized positioning assembly 14 (the same as mechanism 102 in FIG. 9A so the present discussion applies to mechanism 102) may be comprised of any motorized positioning components known to persons having ordinary skill in the art. Such motorized positioning components may have actuators based, for example, on DC motors, stepper motors, or piezoelectric effect. Typically, the motorized positioning assembly 14 has three translation stages for moving a sample 18 along three perpendicular axes of travel (X,Y,Z). The traveling ranges of these translation stages should be long enough to allow positioning sample sections of interest Vs1, Vs2, . . . , VsM within probe volumes V1, V2, . . . , VN. Besides the translation stages, additional positioning degrees of freedom may be useful such as rotations and tilts. Tilt stages can be beneficial in case the optical probe response depends on the tilt sample orientation such is the case with polarization sensitive optical coherence tomography.

For all motorized positioning components, keeping track of their positions is useful in order to perform optical probe registration processes and sampling volume definition as well as to track coordinates of sections of interest Vs1, Vs2, . . . , VsM of the sample being interrogated.

Figure 4:
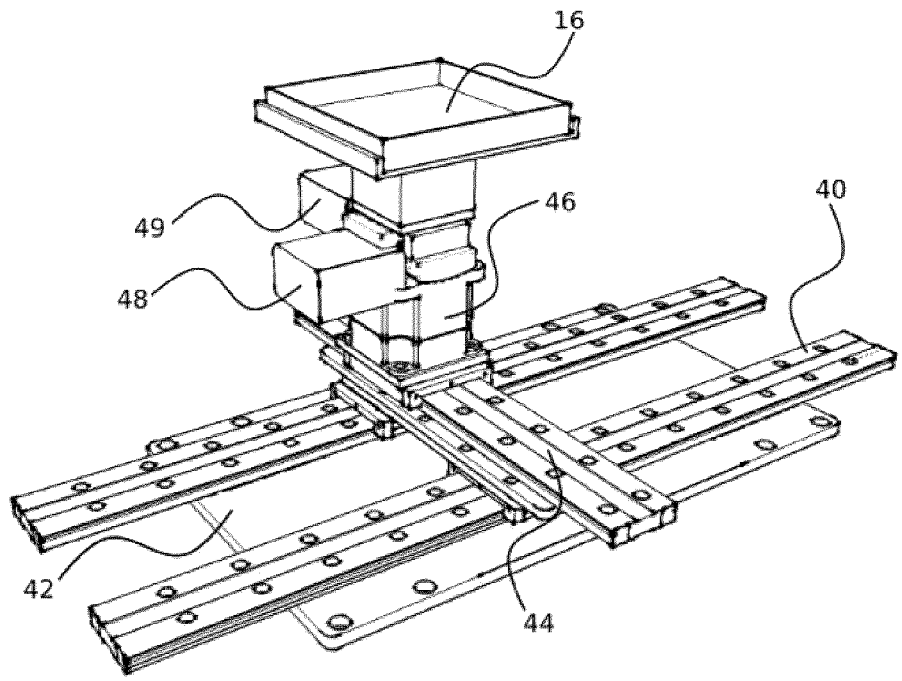
FIG. 4 is a perspective view of an embodiment of a sample holder and motorized positioning assembly forming part of the present system.

This may be done using position encoders or sensors configured and positioned to detect typical stage positions (home and end positions) and to provide reference points for measuring position deviations. FIG. 4 shows an example of a motorized positioning assembly consisting of an X translation stage 40, a Y translation stage 44, a Z translation stage 46, a tilt stage 48 and, perpendicular to it, a second tilt stage 49. A sample holder 16 is mounted on the top of the second tilt stage 49. The whole system is fixed to a baseplate 42 for system robustness and rigidity.

Optical Probe Registration

Figure 5:
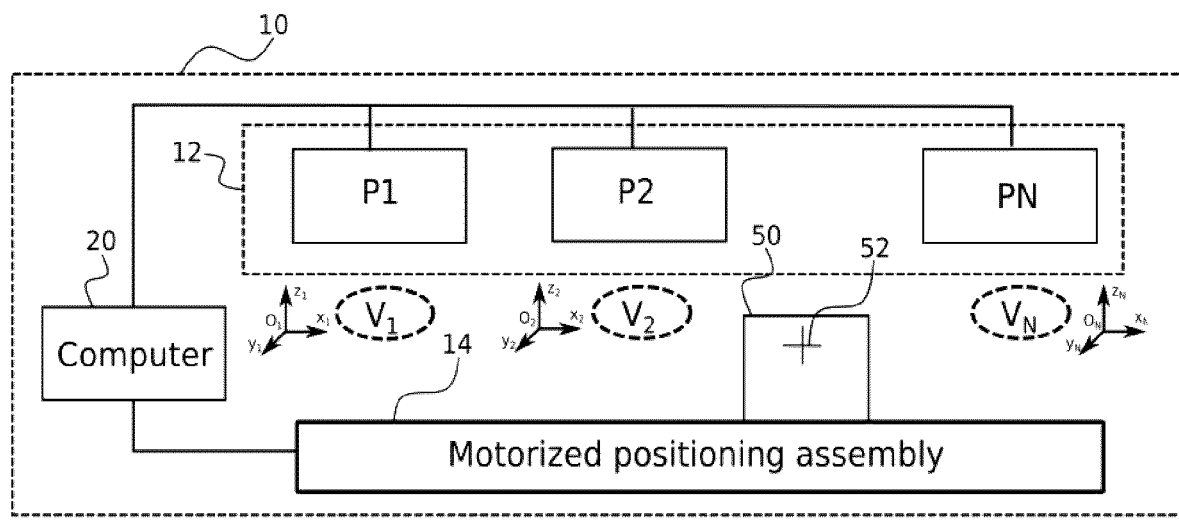
FIG. 5 is a schematic representation of a probe registration module in relation to the portable multi-modal tissue imaging system.

In practical applications, the optical probe registration can be accomplished by using a registration object fixed to motorized positioning assembly 14. As shown in FIG. 5, the registration object 50 contains a geometric feature 52 which can be recognized on images of all probes P1, P2, . . . , PN. The feature 52 resembles a cross; however any geometric feature with the characteristic size smaller than required optical probe registration precision and accuracy can be used for this purpose.

By using motorized positioning assembly 14, feature 52 is brought within various probe imaging volumes V1, V2, . . . VN and imaged. The relative physical positions of feature 52 for recorded images can be easily measured by recording positioning coordinates of motorized positioning assembly 14 which are tracked by the computer 20.

Also, the position of feature 52 within a certain probe imaging volume Vi relative to the origin of corresponding coordinate system CSi can be determined by the image of feature 52 acquired with probe Pi. In this way, relative positions of origins of all coordinate systems CSi can be calculated. The type of coordinate systems CSi (Cartesian, cylindrical, spherical, etc.) and directions of their axes can be made the same for all probes P1, P2, . . . , PN and coincident with degrees of freedom of motorized positioning assembly 14. As noted above, the motorized positioning assembly 14 typically contains translational motorized stages moving along the three perpendicular directions, however in principle the device can have motorized stages with rotational stage replacing one of the translational stages. These directions can be used to define axes of Cartesian coordinate systems CSi related to probes Pi so that the coordinate axis of the coordinate systems CSi are parallel to the perpendicular directions of the motorized translational stages.

Figure 6A:
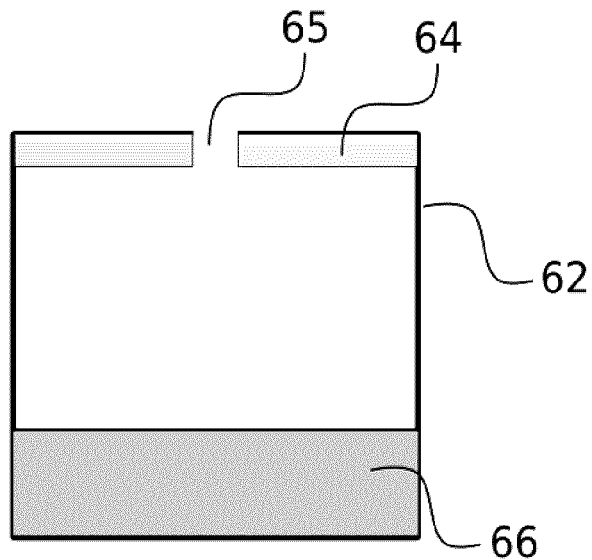
FIG. 6A shows a schematic representation of a pinhole registration module as an example of a probe registration module.

In the disclosure herebelow, several non-limiting examples of probe registration modules are described in cases when all probes P1, P2, . . . , PN are either imaging probes that provide 2D (two dimensional) or 3D (three dimensional) images or they are laser based probes where a sample is probed with a focused laser beam. A pinhole registration module is shown in FIG. 6A. The pinhole registration module comprises a housing 62, module cover 64 having a pinhole 65 and a photo-detector 66 placed below the pinhole 65. The photo-detector 66 is sensitive at all laser wavelengths of the laser based optical probes.

The pinhole 65 and the photo-detector 66 are mounted in housing 62 such that the only light incident at the photo-detector 66 is the light that passes through the pinhole 65.

The position of the focused laser beam of the laser based optical probes can be located by scanning the pinhole in the vicinity of such optical probes using the motorized positioning assembly 14. When the pinhole is at the laser focus, the signal from the photo-detector 66 will be maximal which can be easily detected. For 3D imaging probes (e.g. 3D scanners, OCT probes, confocal scanning microscopes), the position of the pinhole can be easily detected by making a 3D image of the pinhole 65 where pinhole geometry can be easily recognized due to its known shape and size. Similarly, for the optical probes generating 2D images it is possible to detect two coordinates of the pinhole 65 position in the plane defined by the 2D imaging. However, for determining the third coordinate for such a 2D probe, an additional position sensing detector is required.

Figure 6B:
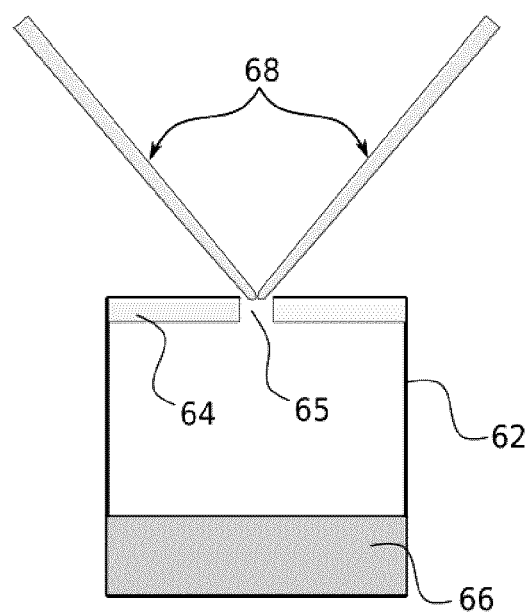
FIG. 6B is a side view of an embodiment of a pinhole registration module localization with white light imaging probes.

In that case, two auxiliary laser beams 68 can be used as shown in FIG. 6B. Referring again to the example registration module shown on FIG. 5, two auxiliary laser beams 68 are aligned such they intersect within the probe volume Vi corresponding to the 2D probe. Then the motorized positioning assembly 14 can be used to place the pinhole 65 at the laser intersection point. That position can be detected either by observing the overlap of the laser spot reflections off the pinhole body on an image created by probe Vi or by detecting the maximum laser beam transmission through the pinhole 65 by using the photo-detector 66. In all cases, the detected position of pinhole 65 can be recorded using the X, Y, Z coordinates of the motorized positioning assembly 14 and can be used as the origin of the local probe coordinate system.

In a second embodiment of a probe registration module design, the registration module contains a pattern that is photo-sensitive at the laser wavelengths of laser based optical probes. When excited with such lasers, the pattern should emit a signal that can be detected with the corresponding optical probes (e.g. Raman or fluorescent signals) thus helping to localize a characteristic pattern point that can provide the origin location of the local coordinate system. Also, the pattern at the registration module should be recognizable when imaged with 2D and 3D imaging probes in order to provide well defined origins of their local coordinate systems. Similar to the pinhole module, in case of 2D imaging probes two auxiliary intersecting laser beams can be used to provide the third coordinate of the characteristic pattern point.

In a third embodiment of a probe registration module design, the registration module contains a photo-sensitive material whose appearance (e.g. color or shade) can be changed when exposed to the laser beams of the laser based optical probes. In this way, for laser based probes, a pattern can be written on the probe registration module at well-defined local coordinates providing simple registration. Such patterns can be subsequently detected by 2D and 3D imaging probes in the same way as described for the second registration module allowing their registration as well.

Sampling Volume Definition

For the sampling volume definition process, a PV probe is used as shown in FIG. 3. For exemplary embodiments, we will consider two types of PV probes. The first type may be a 3D PV probe which can provide a 3D image of a sample or a portion of the sample volume. Referring to FIG. 3, a portion 32 of sample 18 is imaged by probe PV and presented on form 39 on computer display 37. Examples of 3D type PV probes include 3D scanners, optical coherence tomography probes, confocal microscopy probes, and non-linear optical probes. The 3D scanners can be of any type known to a person skilled in the art. Examples include 3D scanners based on time-of-flight, triangulation, structured light, modulated light, stereoscopic systems, and photometric systems. The stereoscopic 3D scanners are usually implemented by using two video cameras, slightly apart, looking at a sample. In our case, the stereoscopic effect is also possible to create by using a single camera that observes a sample at two different positions where sample is positioned by using the motorized positioning assembly. The 3D image of a sample provides coordinates of the sample surface profile relative to the coordinate system with respect to the 3D scanner probe. Once a 3D image of tissue volume 39 is presented to a user, she/he can indicate sample sections of interest Vs1', Vs2', . . . , VsM' on image 39. The techniques of presenting 3D volumes on 2D and 3D computer displays as well as techniques of indicating sections of such 3D displayed images are known to a person having ordinary skill in the art.

Examples of such techniques include direct user input through a graphics user interface (GUI), voice input, or text input. Also, user selection can be facilitated by using predetermined algorithms and other computer inputs such as machine learning and artificial intelligence (AI) instructions. In case predetermined algorithms, machine learning, and AI algorithms perform the majority of the sampling volume definition process, the user interface can establish a simple form that includes only the steps such as inserting and removing a sample into the multi-modal imaging system and activating the imaging process.

The second type of PV probe is a 2D PV probe. An example of a 2D PV probe is a bright field microscope with a camera. In this case, the PV probe provides a 2D projection image of a 3D surface of a sample 122. Since optical probes generally have limited penetration into tissue, the optical probe penetration depth can be used to define the $3^{rd}$ dimension and complete volume definition. Referring again to FIG. 3, image 39 is a 2D image in this case and a user makes choices of Vs1', Vs2', . . . , VsM' which are 2D projections of physical sampling volumes V1, V2, . . . VN. The $3^{rd}$ dimension added to Vs1', Vs2', . . . , VsM' that defines V1, V2, . . . VN sample volumes of interest can be the longest penetration depth among probes P1, P2, . . . , PN.

Figure 7:
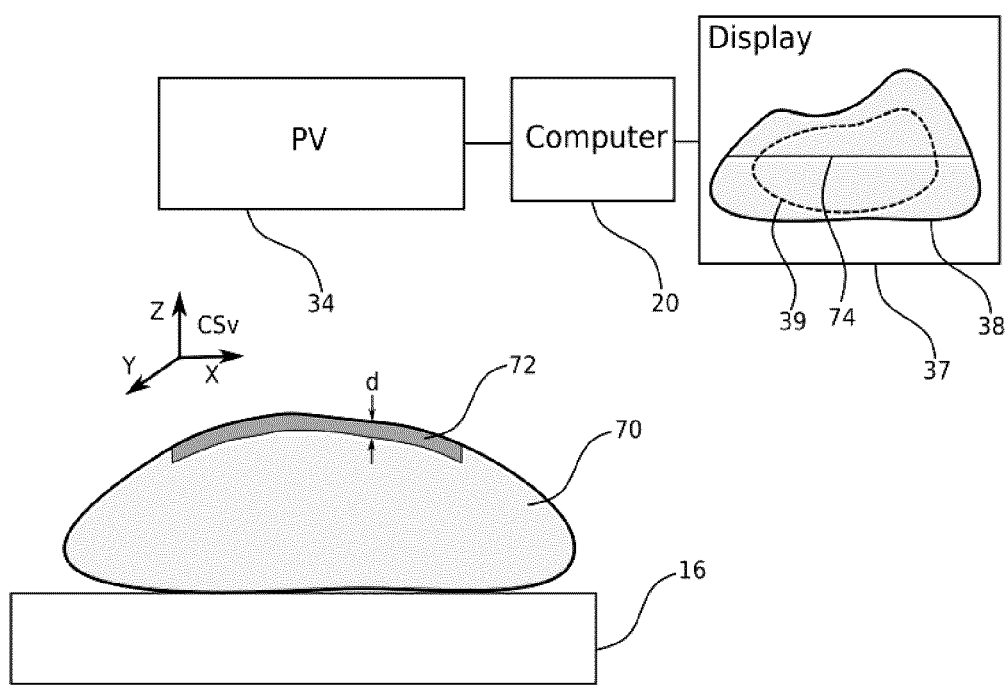
FIG. 7 is a side view of an embodiment of localization of sampling volumes of interest.

FIG. 7 shows a schematic of a sample volume of interest in case of a 2D PV probe. Elements 16, 20, 34, 37, 38, and 39 have the same meaning as specified for FIG. 3. Element 70 in FIG. 7 is a cross section of a portion of a sample whose image 38 is presented on computer display 37. The cross section plane is perpendicular to the imaging plane of 2D probe PV 34. The portion of the sample that is imaged is represented by line 74 on image 38. If the sample is subsequently examined by a probe PM whose imaging penetration depth in the tissue is d, the sample volume of interest 72 is represented in FIG. 7 as a layer whose thickness is d and whose 2D image 39 is presented on computer display 37.

Figure 8A:
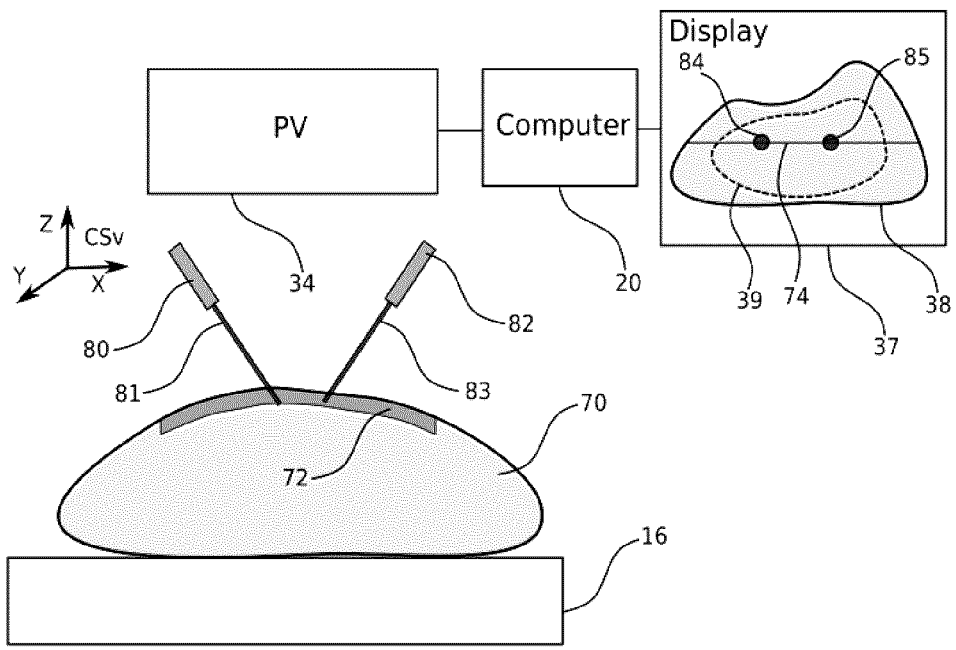
FIG. 8A shows a general system for vertical coordinate determination in relation to sampling volume definition using a 2D optical probe and two guide lasers with crossed beams.
Figure 8B:
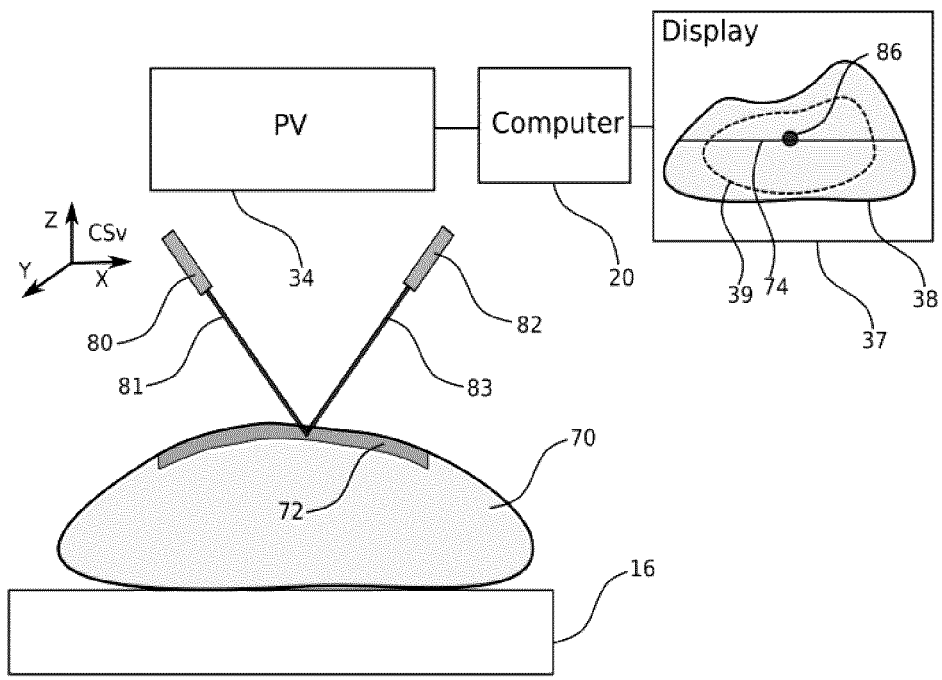
FIG. 8B shows a system from FIG. 8A in the case when alignment is achieved and the vertical coordinate determined.

The remaining parameter required to completely define the contour of volume 72 in coordinate system CSv of probe PV is the distance of volume 72 from probe PV, that is coordinate Z as shown in FIG. 7. A schematic of an exemplary embodiment to determine the Z coordinate of volume 72 is shown in FIGS. 8A and 8B. A pair of auxiliary lasers 80 and 82 have fixed positions above the sample holder in a way that their respective laser beams 81 and 83 intersect within the probe imaging volume Vv of probe PV in case of unoccupied volume Vv.

If a sample is present within volume Vv, the laser intersection point will not generally coincide with the surface of the sample as shown in FIG. 8A where the sample is represented by its cross section 70. The reflections of two laser beams can be visible as two dots 84 and 85 at the image of sample 38 on computer display 37. If the sample is moved perpendicular to the imaging 2D plane of probe PV by using the motorized positioning assembly described previously, at certain point the surface of the sample with coincide with the intersection point of two lasers as shown in FIG. 86. This position can be recognized on sample image 38 when images of reflected laser beams merge into a single dot 86. Since the position of the intersection point between two laser beams is fixed in coordinate system CSV, the sample position shown in FIG. 8B uniquely determines the position of the sample within volume Vv.

Figure 9A:
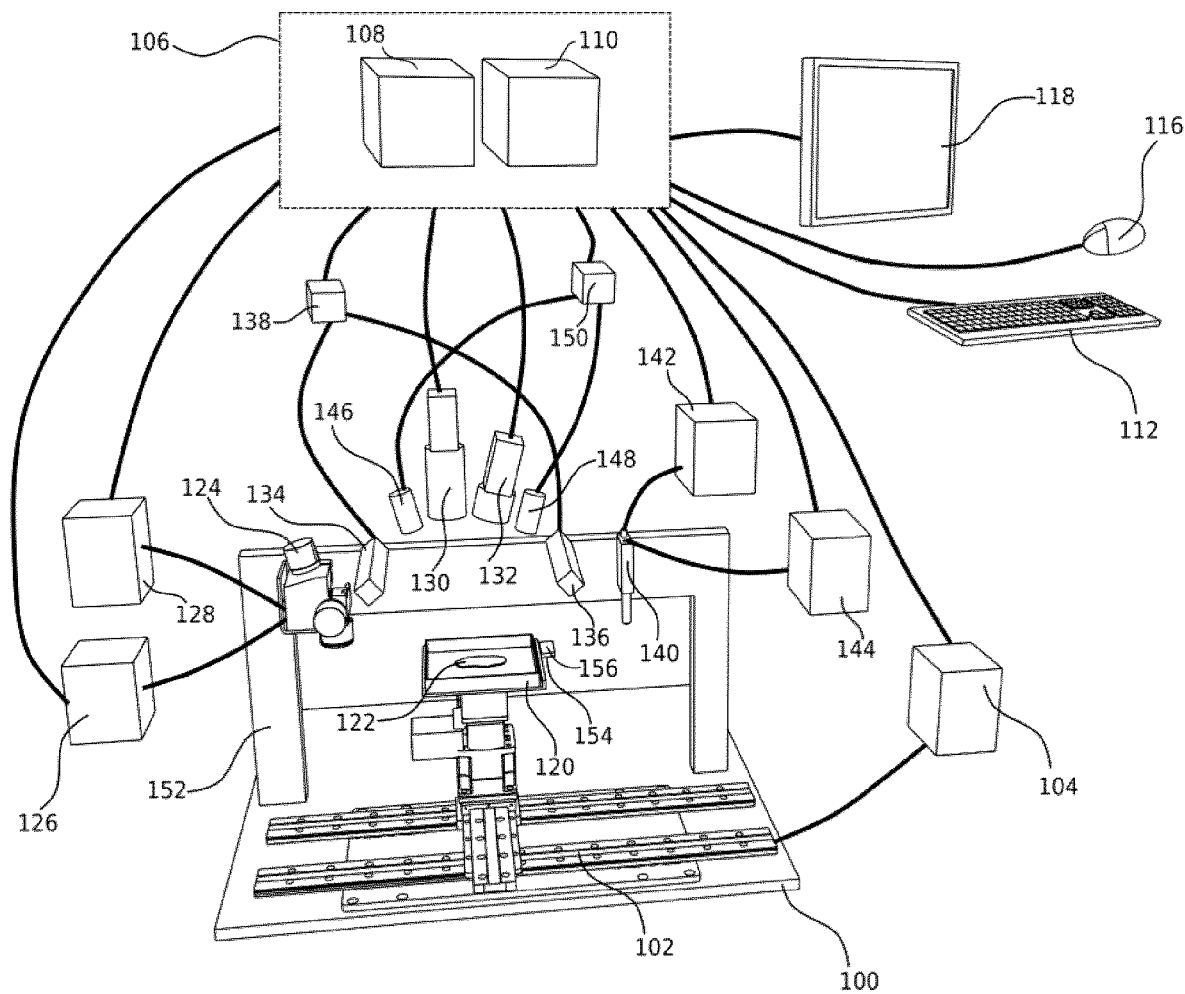
FIG. 9A shows a schematic of an exemplary embodiment of the multi-modal optical imaging system for tissue analysis.

Another way of determining the vertical position of a sample in coordinate system CSv is by using a 2D optical probe Pv with a small depth of field and a known focal plane position. By moving a sample section of interest along the vertical coordinate by using the motorized positioning assembly 14 (or mechanism 102 as shown in FIG. 9A), it is possible to bring the image of the sample section of interest into sharp focus on the computer display indicating the position of the sample section of interest at the focal plane of probe PV thus determining the Z coordinate of the sample section of interest within the coordinate system CSv.

Optical Probe Description

After the position of sample 18 is registered and sample sections of interest Vs1, Vs2, . . . , VsN are chosen, data acquisition can begin. The data acquisition procedure will depend on the type of a corresponding optical probe being used. For the present optical biopsy system, any type of bio-imaging probe and any possible mode of operation of such a probe known to a person skilled in the art may be used. These include optical probe systems previously disclosed in academic and patent literature, sold by a commercial vendor, or developed in-house.

Non-limiting examples include probes based on the following techniques.

(a) Spontaneous Raman Scattering

In this case, optical signals originate from inelastic Raman scattering of an excitation laser beam off a sample. The spectrum of the Raman signal depends on the type of chemical bonds within the sample. More details about the nature of the signal and Raman probes can be found in references: Latka et al., 'Fiber optic probes for linear and nonlinear Raman applications—Current trends and future development,' Laser Photonics Rev. 7, No. 5, 698-731 (2013), which is incorporated herein by reference in its entirety.

(b) Stimulated Raman Scattering (SRS)

SRS carries similar information as the spontaneous Raman scattering however the optical interaction is amplified through coherent amplification. More details about the nature of the signal and SRS probes can be found in reference Ji et al., 'Rapid, Label-Free Detection of Brain Tumors with Stimulated Raman Scattering Microscopy,' Sci Transl Med 5, 201ra119 (2013), which is incorporated herein by reference in its entirety.

(c) Coherent Anti-Stokes Raman Scattering (CARS)

CARS is another variant of coherent Raman scattering. More details about the nature of the signal and CARS probes can be found in the reference: Latka et al., 'Fiber optic probes for linear and nonlinear Raman applications—Current trends and future development,' Laser Photonics Rev. 7, No. 5, 698-731 (2013), which is incorporated herein by reference in its entirety.

(e) Optical Coherent Tomography (OCT)

OCT is technique analogue to ultrasound in which 3D image of the object can be generated from time-of-flight information. OCT uses light wave instead of sound wave as in ultrasound which provides images with a much higher resolution. More information on OCT can be found in the reference: Jafri et al., 'Optical coherence tomography guided neurosurgical procedures in small rodents,' Journal of Neuroscience Methods 176 (2009) 85-95.

(f) Polarization Sensitive Optical Coherent Tomography (PS-OCT)

PS-OCT is a functional variant of OCT in which the polarization of the sample can also be imaged. This enables contrast like tissue organization to be imaged. More information on PS-OCT can be found in the reference: Ding et al., 'Technology developments and biomedical applications of polarization-sensitive optical coherence tomography' Front. Optoelectron. 2015, 8 (2): 119-121, which is incorporated herein by reference in its entirety.

(g) Hyperspectral Imaging (HSI)

HSI is a hybrid modality that combines imaging and spectroscopy. By collecting spectral information at each pixel of a two-dimensional (2-D) detector array, hyperspectral imaging (HSI) generates a three-dimensional (3-D) dataset of spatial and spectral information. More information on HIS can be found in the reference: Lu et al., 'Medical hyperspectral imaging: a review,' Journal of Biomedical Optics 19(1), 010901 (2004), which is incorporated herein by reference in its entirety.

(h) Fluorescence Imaging

In vivo fluorescence imaging uses a sensitive camera to detect fluorescence emission from fluorophores in whole-body living small animals. More info on fluorescence imaging can be found in the reference: Yao et al., 'Fluorescence imaging in vivo: recent advances,' Current Opinion in Biotechnology 2007, 18:17-25, which is incorporated herein by reference in its entirety.

(i) Fluorescence Lifetime Imaging Microscopy (FLIM)

FLIM is an imaging technique for producing an image based on the differences in the exponential decay rate of the fluorescence from a fluorescent sample. The lifetime of the fluorophore signal, rather than its intensity, is used to create the image in FLIM. This has the advantage of minimizing the effect of photon scattering in thick layers of sample. More information on FLIM can be found in the reference: Becker, 'Fluorescence lifetime imaging techniques and applications,' Journal of Microscopy 2012, May 24, which is incorporated herein by reference in its entirety.

(j) Second Harmonic Imaging Microscopy (SHIM)

Second harmonic imaging microscopy is based on a nonlinear optical effect known as second-harmonic generation (SHG). More details about the nature of the signal and probes for second harmonic imaging microscopy can be found in Campagnola, Paul J., and Leslie M. Loew. "Second-harmonic imaging microscopy for visualizing biomolecular arrays in cells, tissues and organisms." Nature biotechnology 21.11 (2003): 1356-1360, and relevant references referred to therein, which are incorporated herein by reference in their entirety.

(k) Third Harmonic Imaging Microscopy

Third harmonic imaging microscopy is based on a nonlinear optical effect known as third-harmonic generation (THG). More details about the nature of the signal and probes for third harmonic imaging microscopy can be found in Kuzmin, N. V., et al. "Third harmonic generation imaging for fast, label-free pathology of human brain tumors." Biomedical Optics Express 7.5 (2016): 1889-1904, and references referred to therein, which are incorporated herein by reference in their entirety.

An Example of Full Embodiment

Figure 9B:
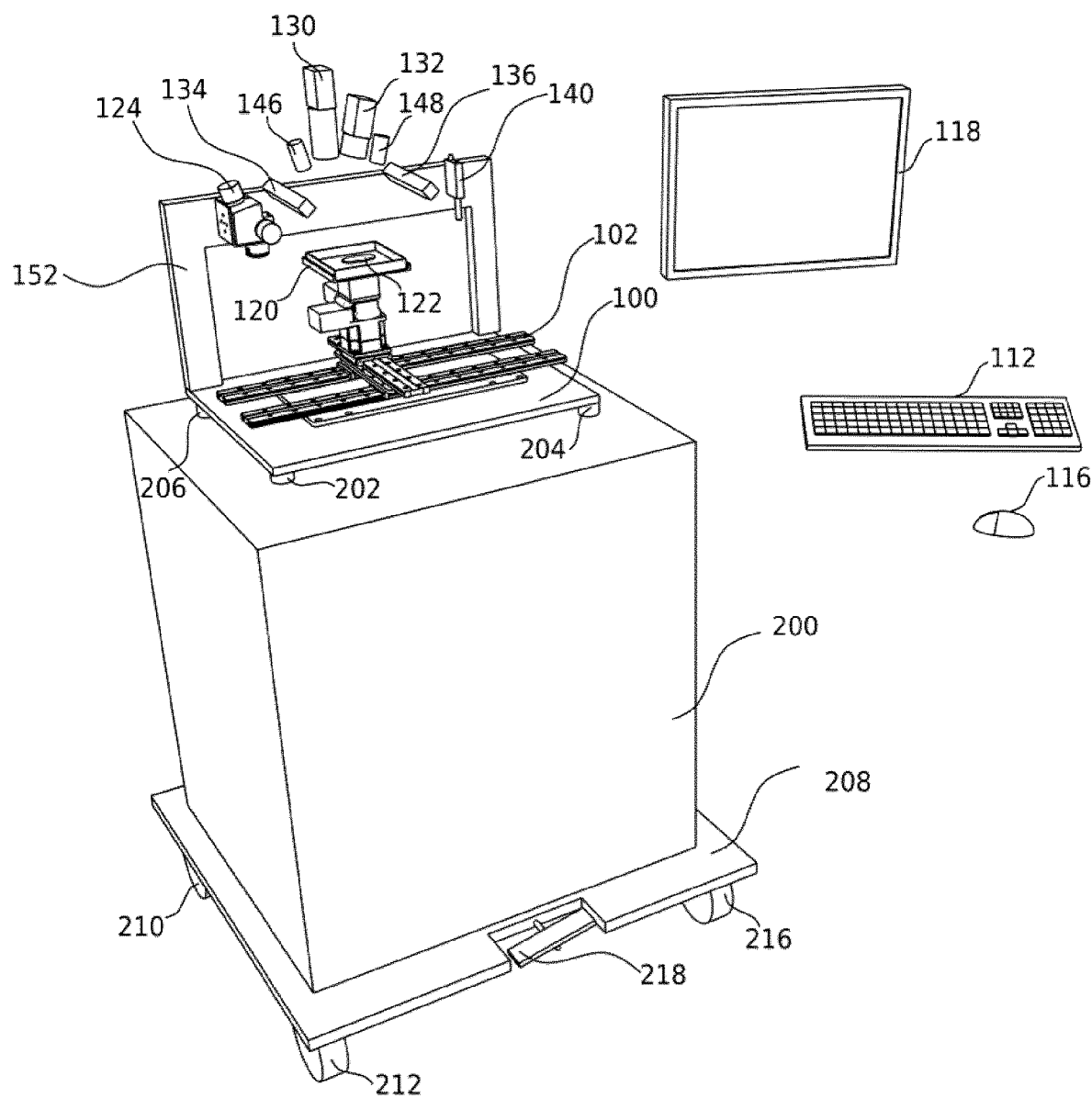
FIG. 9B shows the system presented in FIG. 9A that is mounted on a mobile unit.
Figure 9C:
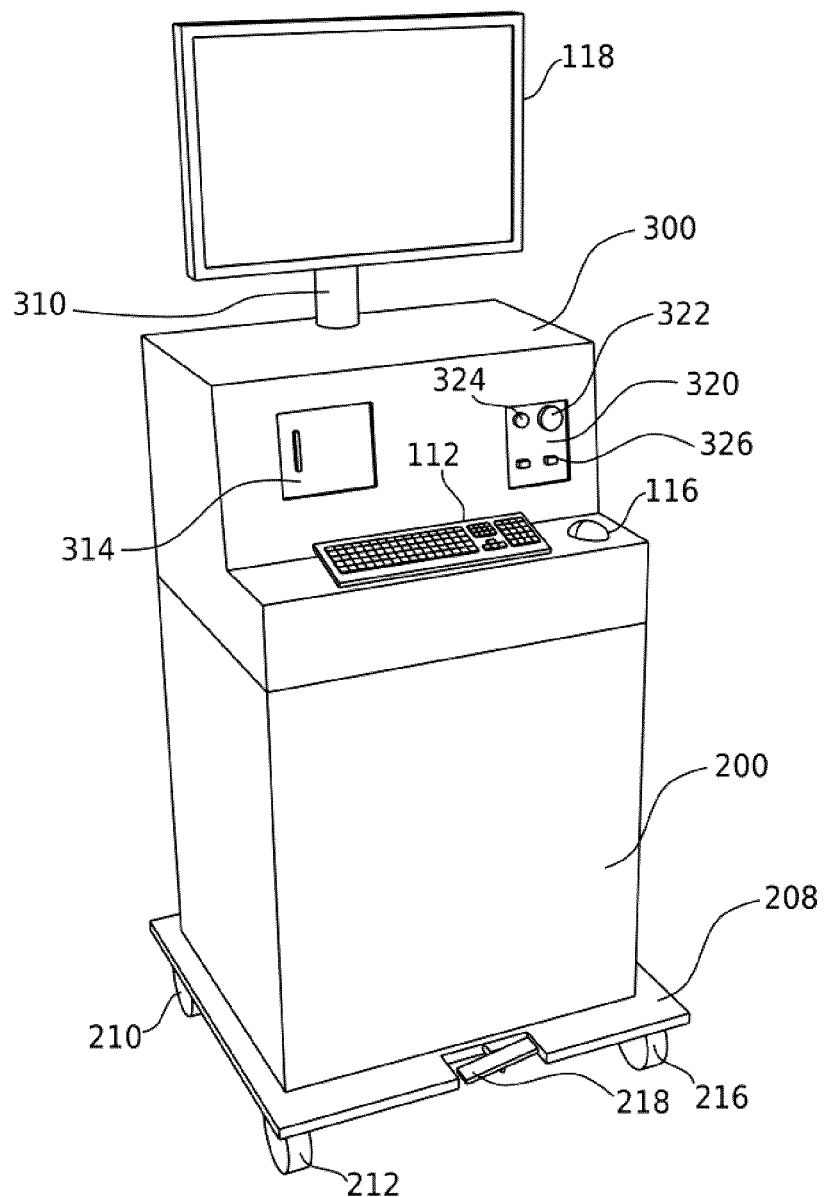
FIG. 9C shows the system presented in FIG. 96 that includes an additional enclosure box for the multi-modal probe system.

A layered structure of an example of an embodiment of a multi-modal optical imaging system for tissue analysis constructed in accordance with the present disclosure is presented in FIGS. 9A, 96, 9C. In FIG. 9A, the main opto-mechanical components are indicated. For fiber coupled optical probes described in the present disclosure, the term "distal" refers to the end of the optical fiber closest to a sample 122 while the term "proximal" refers to the opposite end of the optical fiber.

A sample 122 is placed on a sample holder 120 which is attached to a motorized positioning assembly 102 which is the same as assembly 14 described previously in relation to FIG. 4. For structural integrity and robustness, motorized positioning assembly 102 is fixed on the top of a sample system base-plate 100 which can be made of a stainless steel or aluminum and is typically 10-15 mm thick. Motorized positioning assembly 102 is controlled through a motorized stage driver 104 that provides necessary electrical driving signals for the motorized stage actuators as well as collects electrical signals from the assembly sensors (such as encoders) that inform about the state of the assembly. Electrical power and control signals for motorized stage driver 104 are provided through a main control system 106 that includes electrical power supplies 108 and control computer 110 that has the same role as computer 20 described previously in relation to FIGS. 1, 2, 3, 5, 7, 8A, and 8B.

A user interacts with the computer 110 through a computer display 118, keyboard 112, mouse 116, and potentially by using any other computer interacting peripheral device available on the market. Optical probes used for sample analysis are attached to a mechanical frame 152 that is fixed to sample system base-plate 100. Simple brackets used to attach the optical probes to mechanical frame 152 are not shown in FIG. 9A for drawing simplicity.

An optical coherence tomography (OCT) optical probe system can be any OCT system mentioned previously and in this exemplary embodiment includes an OCT control system 126, optical scanner 124, and an optical scanner driver 128. OCT control system 126 contains typical OCT system components described in the previously disclosed references, such as a laser excitation source, an interferometer, a reference arm, optical detectors, electrical circuitry needed for the operation, as well as electrical and optical cables connecting individual components. An optical fiber acting as an OCT sample arm connects OCT control system 126 to optical scanner 124 that can scan the OCT sample laser beam across sample 122. The electrical power and control computer signals are provided through control system 106.

A coupled Raman probe 140 is used to excite sample 122 using a fiber coupled narrow line-width laser source 142 and further collects and transfers the corresponding Raman signal to a spectrometer 144. The electrical power and control computer signals for laser source 142 and spectrometer 144 are provided through control system 106.

In addition, a wide-field microscope 132 and narrow-field microscope 130 are installed as convenient probes for quick sample examination as well as for sampling volume definition. Microscope signals are recorded by integrated cameras that are powered and controlled by the control system 106.

Illumination sources 134 and 136 provide illumination for the wide-field and narrow-field microscopes 130 and 132 and they are controlled through an illumination controller 138 which is powered and controlled with the control system 106. Guide lasers 146 and 148 are fixed in a geometry such that their laser beams cross approximately at the center of fields of view of the narrow-field and wide field microscopes. Lasers 146 and 148 are controlled through a guide laser driver 150 which is powered and controlled with the control system 106 as well. The function of guide lasers 146 and 148 was described in relation to FIGS. 6A, 8A, 8B.

To facilitate deployment of the system presented in FIG. 9A at the place of interest (e.g. a surgical operating room), this system can be installed within a mobile unit described in FIGS. 9B and 9C.

As shown in FIG. 9B, the electrical components and the optical elements at the distal sides of the fiber coupled optical probes can be enclosed in a cabinet 200 that is attached at the top of a base plate 208. Base plate 208 is mounted on casters 210, 212, 216, and a $4^{th}$ caster that is not visible on in the figure. A break 218 provides a means to lock the casters in place and fix the system within a place of interest for safety and for reducing mechanical disturbances during optical signal acquisitions. Additional elements for improving mechanical stability are vibrational isolators 202, 204, 206 that fix the base plate 100 to cabinet 200. More vibrational isolators could be present and not visible in the figure. For mounting simplicity, some smaller electrical components and optical elements on the distal fiber ends can be placed on base plate 100 as well. For drawing simplicity, electrical and optical cables connecting various elements are not shown in FIG. 9B.

As shown in FIG. 9C, an additional enclosure 300 can be installed on the top of cabinet 200 which encloses the optical probe system mounted on base plate 100. Enclosure 300 protects the internal optics from external disturbances, protects a user from exposure to optical probe laser beams, creates a controlled environment for sample data acquisition, including a stable thermal environment and creates light-tight space within the enclosure 300 suitable for optical probe acquisitions of small signals that can be otherwise overwhelmed by external ambient light.

The enclosure 300 has a door 314 which can be used as an entrance point for inserting in and removing sample 18 out of sample holder 120. A monitor stand 310 provides a fixture for computer display 118. A front console 320 provides a mounting space for an emergency stop button 322, power button 324, as well as computer peripheral connections such as USB ports or video connections (DVI, HDMI, or VGA).

In case of very sensitive optical probes or more dangerous optical probe excitation laser beams, an additional enclosure within enclosure 200 can be installed.

Figure 10:
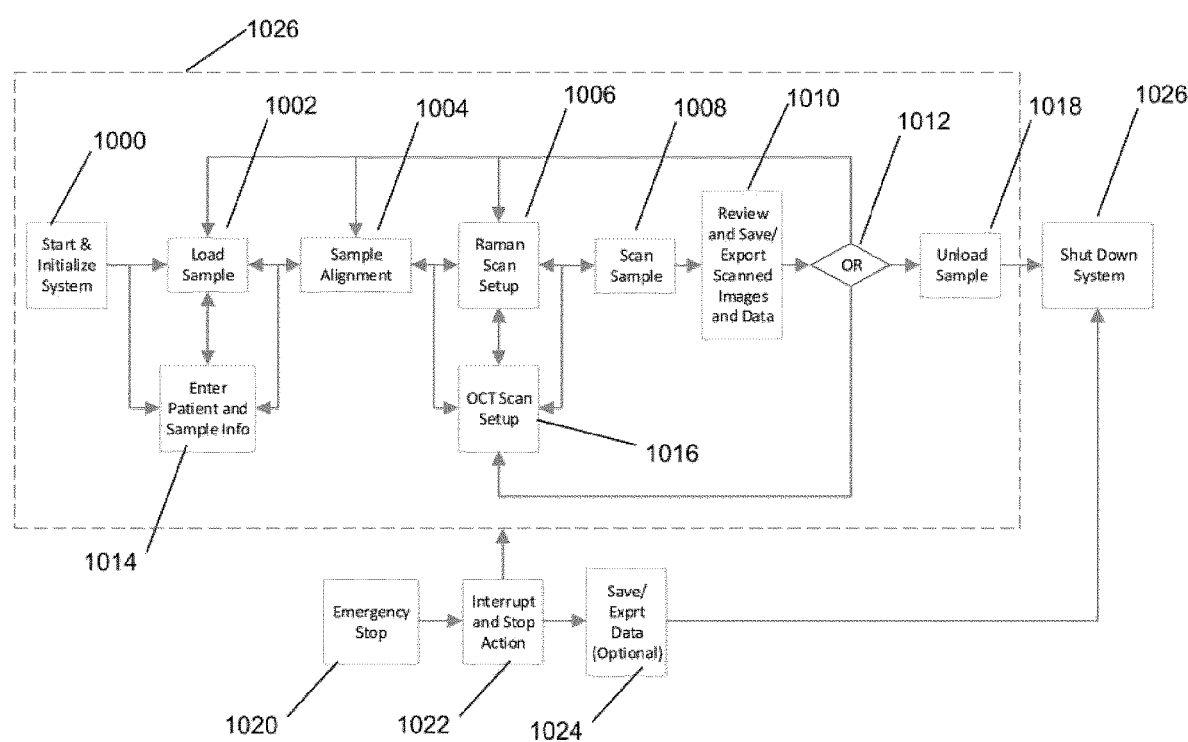
FIG. 10 is a representative process flow chart showing non-limiting process steps involved in using the multi-modal optical imaging system presented in FIG. 9C.

FIG. 10 presents the basic work-flow for the system described in relation to FIG. 9C. Since optical probes are rigidly mounted on a common frame, optical probe registration can be done only occasionally. During a daily procedure, the system is initialized and started typically by pressing power button 324. The control computer 110 functions described earlier can be incorporated in a single control software program with a suitable user interface. After a user fixes a sample 122 onto sample holder 120, he/she can enter the sample information within the control software where that information will be linked to acquired data. Subsequently, motorized positioning assembly 102 brings the sample underneath the designated probes where sampling volume definition is performed. In this case, these probes are narrow-field and wide-field microscopes.

After the user chooses the sampling regions of interest, motorized positioning assembly 102 moves sample 122 underneath OCT and/or (depending on the user choice) Raman probes where data acquisition is performed. The user then reviews the data, and based on the feedback may decide to terminate the session by unloading the sample; or to define and analyze new sampling regions of interest; or to load another sample. In case of an emergency, the user has an option to terminate the session at any time by pressing emergency stop button 322 in which case the current acquired data is saved and the sample 122 gets ejected.

Referring to FIG. 10, the workflow initiates at the start with an initialize system 1000 step. Next a sample 122 is loaded at step 1002. Patient and sample information can also be entered into the system at step 1014. Next, the area of interest in the system is aligned with respect to the white light camera at step 1004.

Once the sample 122 is aligned, the user can setup for a Raman scan (step 1006) and OCT scan (step 1016). Thereafter, the sample 122 is scanned at step 1008. After completion of the scan, the data can be reviewed by the user, and/or saved for export (step 1010).

Once the scan is completed (step 1010), the user may select to continue scanning where the workflow will revert back to one of the previous steps (i.e., steps 1002, 1004, 1006 or 1016). Alternatively, if all scanning is completed, the user may unload the sample (step 1018) and shut down the system (step 1026).

During any operation steps of the system (i.e., steps 1000 to 1018, also illustrated by box 1026), an emergency stop action can take place to interrupt this process. If an emergency stop is required, the emergency stop button 322 is pressed (step 1020). Thereafter, the system is interrupted and all action is stopped (step 1022). The user is also presented with an option to save and/or export the data (step 1024). If the emergency stop is initiated, the system will also terminate with the system being shut down (step 1026).

Figure 11A:
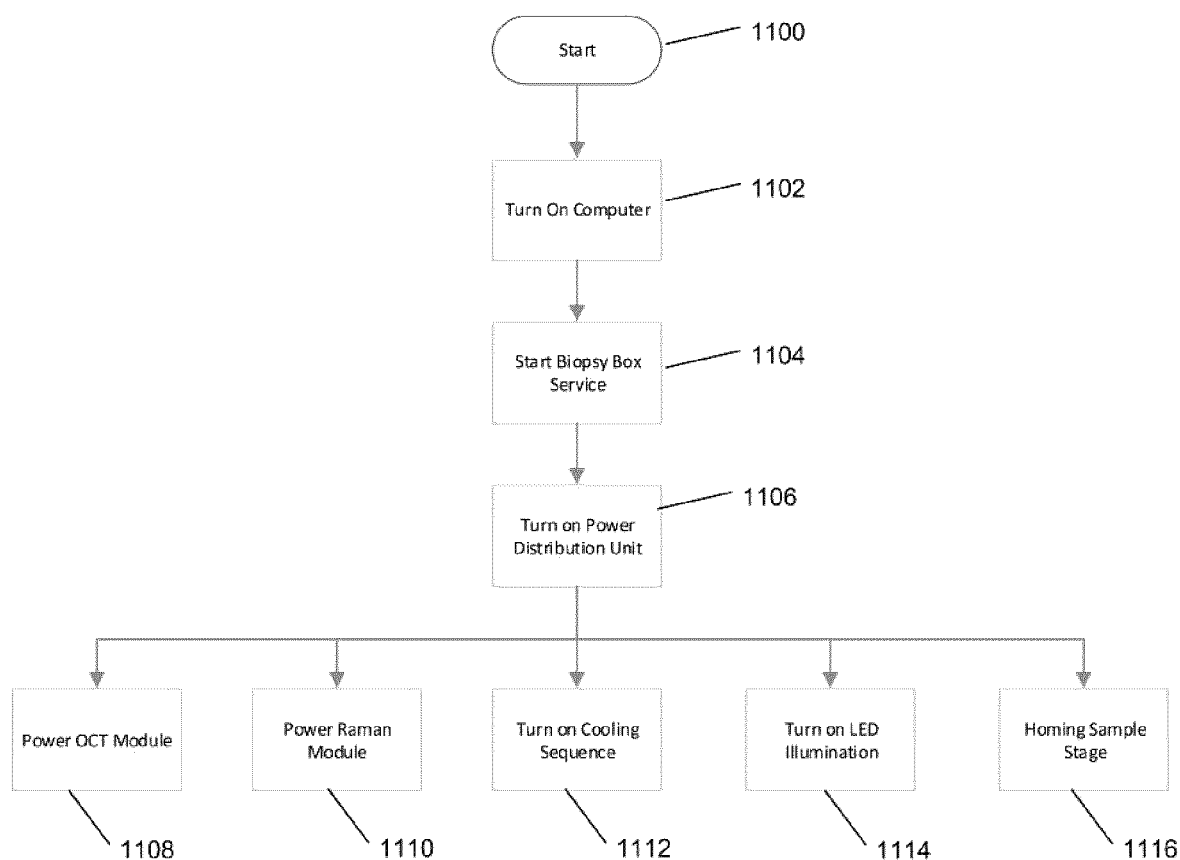
FIG. 11A is the detailed start and initialization steps of the user workflow as presented in FIG. 10.

FIG. 11A is the detailed start and initialization steps of the user workflow as presented in FIG. 10, in particular, step 1000. As seen in FIG. 11A, the process starts at step 1100. The computer 20 (FIG. 1) or 110 (FIG. 9B) is turned on (step 1102) and the service is initiated (step 1104). Thereafter, the service turns on the power distribution unit (1106) to power on the various system modules. The power distribution unit will power on the OCT module (step 1108), the Raman module (step 1110), the cooling sequence (step 1114) and turn on LED illumination (step 1114). Subsequently, the sample stage is moved to the home configuration orientation (step 1116).

Figure 11B:
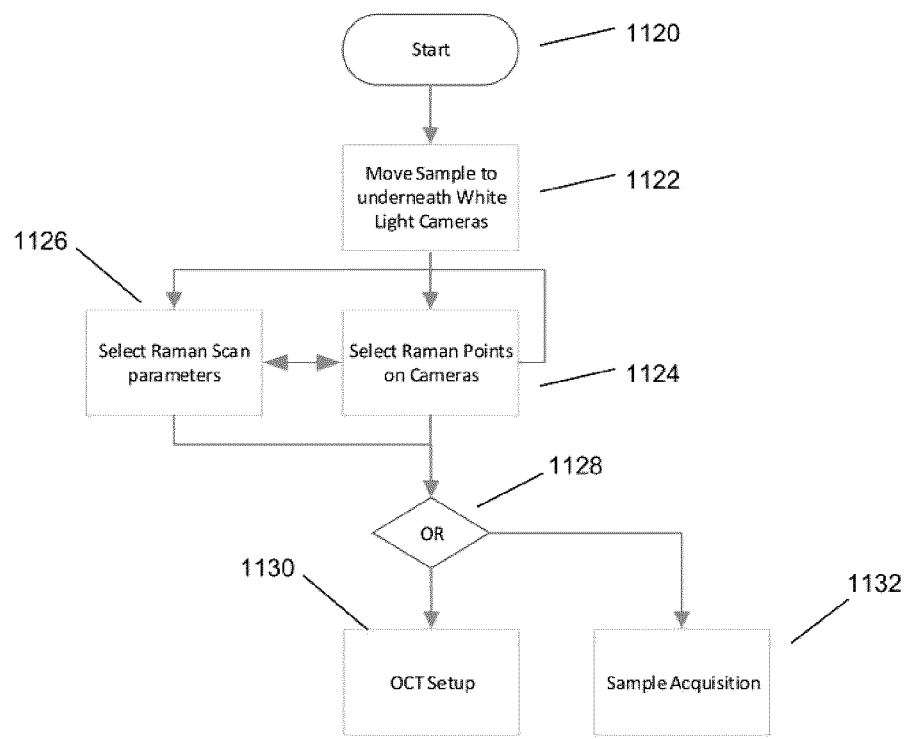
FIG. 11B is the detailed Raman setup steps of the user workflow as presented in FIG. 10.

FIG. 11B is the detailed Raman setup steps of the user workflow as presented in FIG. 10, in particular step 1006. As seen in FIG. 11B, the process starts at step 1120. The sample is placed underneath the white light camera (step 1112). Next, the user selects the points for the Raman scan based on the image presented on the white light camera at step 1124. After the sample is placed under the white light camera, the user can select the point to do the Raman measurement and select the scan parameters for the points selected in step 1116.

Once steps 1124 or 1126 is completed, the user is presented with a choice (step 1128) of either proceeding with an OCT scan setup (step 1130) for the same sample or continue with sample acquisition (step 1132). Both of these steps will be further elaborated in FIGS. 11C, 11D and 11E.

Figure 11C:
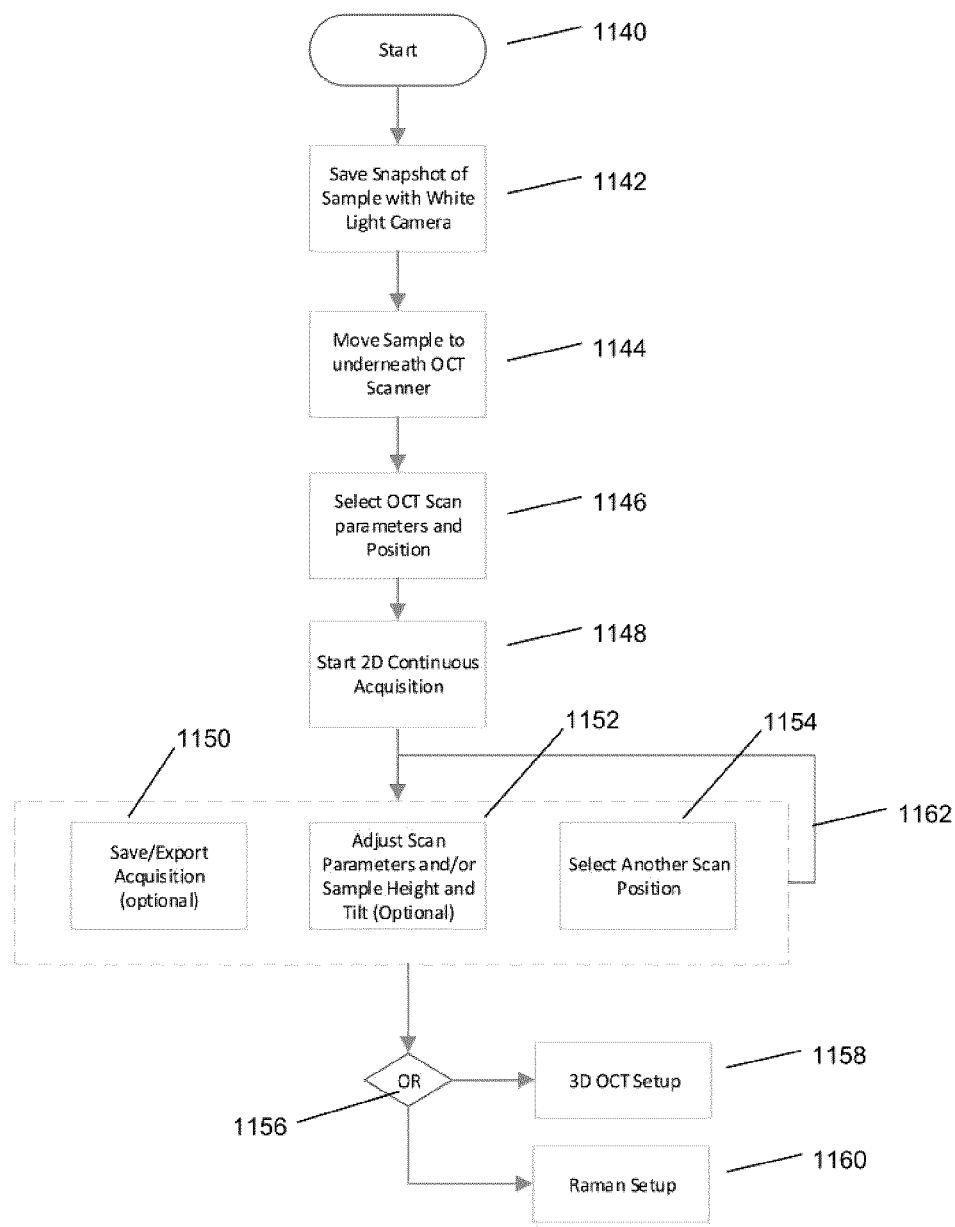
FIG. 11C shows OCT scan setup and preview steps of the system showing user workflow as presented in FIG. 10.

FIG. 11C is an OCT scan setup and preview steps of the system user workflow as presented in FIG. 10 as step 1016 and step 1130 in FIG. 11B. As shown in FIG. 11C, the process initiates at step 1140. Thereafter, a snapshot of the sample is captured by the white light camera and saved within the system in step 1142. Next, the sample is moved underneath the OCT scanner (step 1144) where the scan parameters and the area/line of interest can be selected (step 1146). Next, the system starts a 2D continuous acquisition (step 1148).

During the acquisition stage (step 1148), the user can view the acquired data in real-time and can select one or more options as outlined in block 1162. These options include, saving or exporting the acquisition (step 1150), adjusting the scan parameters as well as moving the sample height and tilt (step 1152), and/or selecting another scan position (step 1154). Once the options are completed (step 1156), the workflow proceed to a 3D OCT setup (step 1158) which is further elaborated in FIG. 11D or a Raman setup (step 1160) which is further explained in FIG. 11B.

Figure 11D:
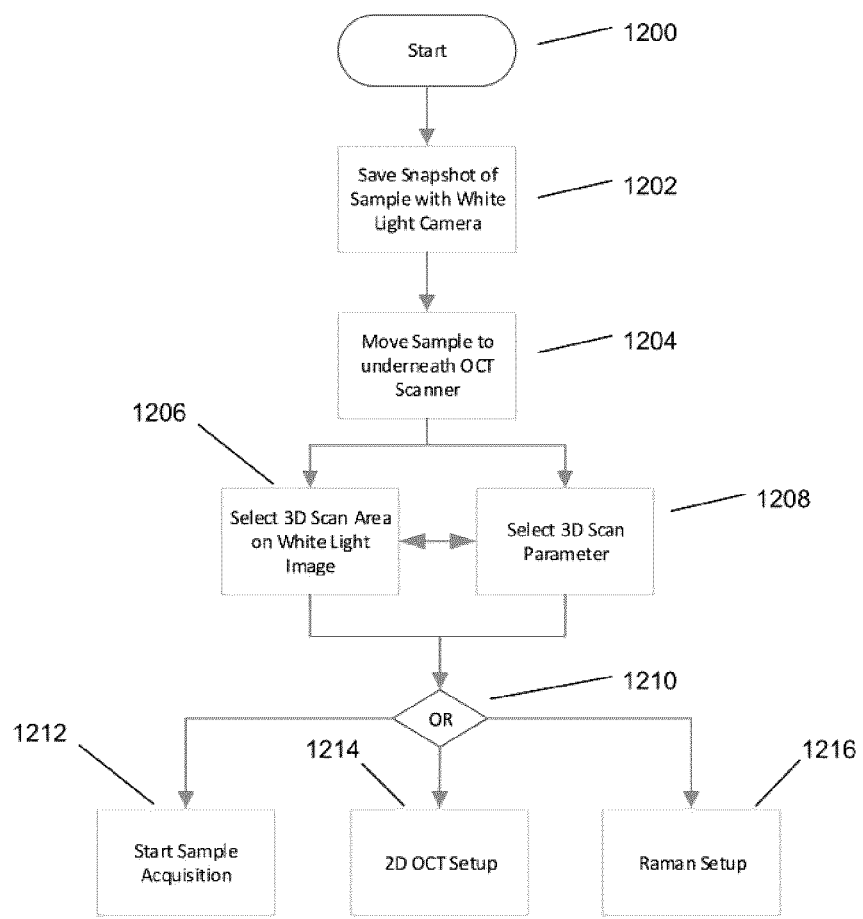
FIG. 11D shows 3D OCT scan setup steps of the system user workflow as presented in FIG. 10.

FIG. 11D discloses the 3D OCT scan setup steps of the system user workflow as presented in as step 1016 in FIG. 10 and step 1158 in FIG. 11C. As seen in FIG. 11D, the process initiates at step 1200. Thereafter, a snapshot of the sample is captured by the white light camera and saved within the system in step 1202. Next, the sample is moved underneath the OCT scanner (step 1204). Thereafter, the system selects the 3D scan parameters (step 1208) and/or the 3D scan area on the white light image (step 1206).

Figure 11E:
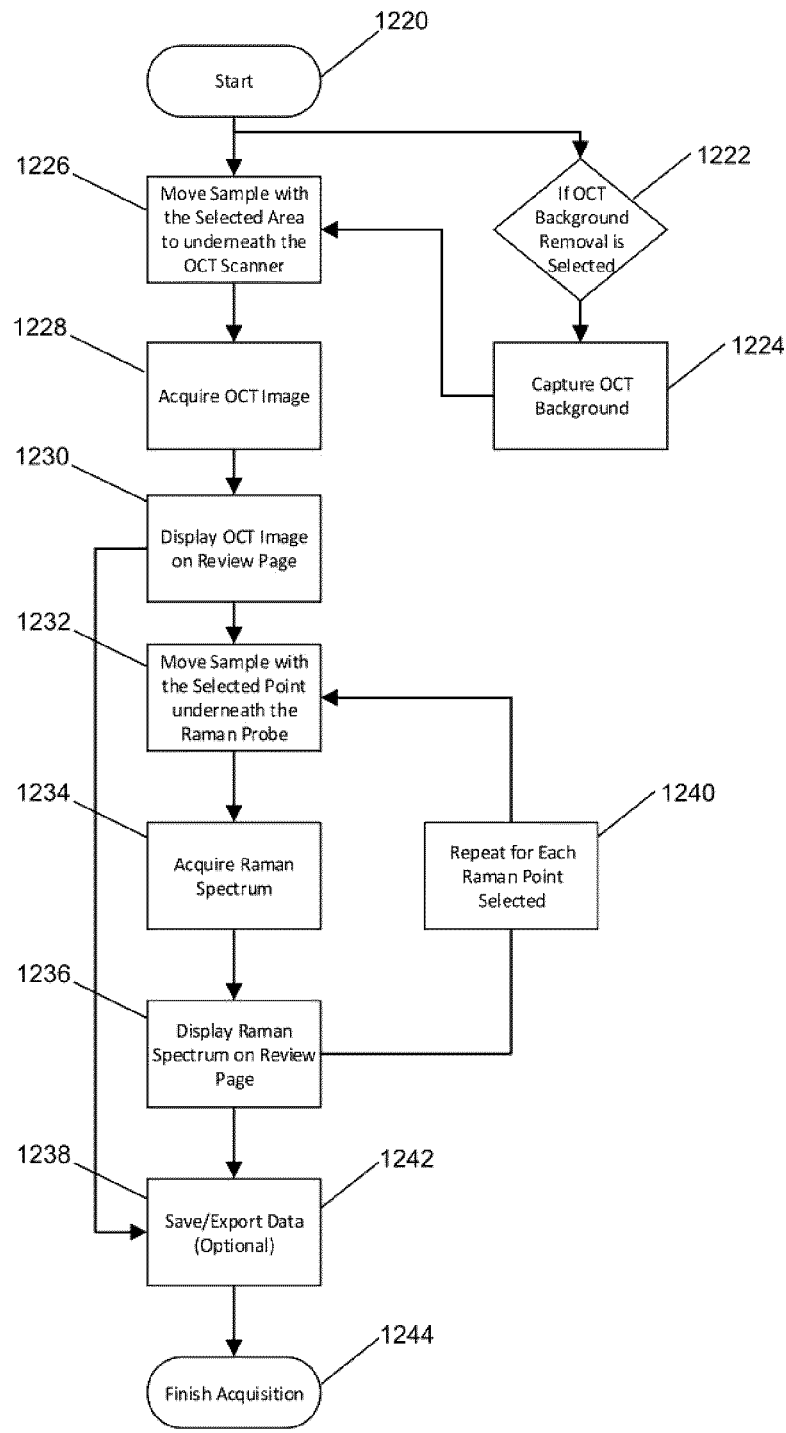
FIG. 11E shows data acquisition steps of the system user workflow as presented in FIGS. 11B, 11C, and 11D.

Once the parameters are selected (step 1210), the system further proceeds to start a sample acquisition (step 1212) which is further explained in FIG. 11E, conduct a 2D OCT setup (step 1214) which is further explained in FIG. 11C or conduct a Raman setup (step 1216) which is further explained in FIG. 11B.

FIG. 11E discloses data acquisition steps of the system user workflow as presented in FIG. 10 (step 1008 and step 1010), 11B (step 1132), and 11D (step 1212). As seen in FIG. 11E, the process initiates at step 1220. The sample is moved underneath the OCT scanner in step 1226. An OCT image is subsequently acquired in step 1228. The image is then displayed on a Review page of the biopsy system user interface in step 1230.

Next, the sample is moved with the selected points of interest underneath the Raman probe (step 1232). Thereafter, a Raman spectrum graph is acquired (step 1234). The Raman spectrum is displayed in the biopsy system software for review (step 1236). Once one point has been scanned, the system moves the sample to an the next selected point for Raman scanning (step 1240). This process repeats itself (i.e., steps 1232, 1234, 1236 and 1240) until all the selected points are scanned.

The next step is to save and/or export the data (step 1242). Alternatively, the image display on the OCT user interface (step 1230) may be directly saved (step 1242). Once the saving is completed, the acquisition is phase is completed (step 1244).

In further embodiments of FIG. 11E, once the process is initiated (step 1220), there is an option to remove the OCT background (step 1222) where artifacts may be removed from the background of the OCT image. Once this is completed, the OCT background is captured (step 1224) and is subtracted from the acquired OCT image of the sample which will result in a cleaner image. After the OCT background is captured (step 1224), the process reverts back to the original placement of the OCT sample (step 1226).

The multi-modal imaging system disclosed herein is ideally contemplated for use in pathology labs, however, a person skilled in the art may apply this system to other similar uses. For example, beyond applications in pathology, this device may also be used in research and development activities for investigating response of various tissues to different types of optical probes and correlating such data from various types of optical probes.

In addition to combining OCT modules and Raman modules in the multi-modal imaging system disclosed herein, a person skilled in the art may contemplate other imaging modalities that can be added into the biopsy system. For example, a person skilled in the art may envision that a 3D optical scanner or probe may be incorporated into the existing multi-modal imaging system. A 3D scanner will provide a surface contour scan of the tissue sample. Surface contours will provide an actual 3D image of the sample under white light conditions and provide the distance of the probe Pi to the sample which will assist in the alignment of the probe Pi during the alignment process. Furthermore, the surface contour can be used to segment out the tissue surface in the OCT image, as well as the sample area within the camera image. Mapping a pixel location on a 2D display to the 3D sample surface requires knowledge of the height of the sample at the pixel location, so a 3D surface profile aids in providing accurate registration between user interface and sample coordinates. In addition, having a 3D scan of a sample allows for sample correlation between multiple scanning sessions performed on the same sample. While the teachings described herein are in conjunction with various embodiments for illustrative purposes, it is not intended that these teachings be limited to such embodiments. On the contrary, the teachings described and illustrated herein encompass various alternatives, modifications, and equivalents, without departing from the embodiments, the general scope of which is defined in the appended claims.

Except to the extent necessary or inherent in the processes themselves, no particular order to steps or stages of methods or processes described in this disclosure is intended or implied. In many cases the order of process steps may be varied without changing the purpose, effect, or import of the methods described.

What is claimed is:

1. A modular system for organic sample analysis of tissue, comprising:
   a sample stage comprising a support platform, a motorized positioning assembly mounted on said support platform, the support platform comprising a vibrationally damped base, the vibrationally damped base preventing noise in an optical signal, and a sample holder mounted on said motorized positioning assembly upon which a tissue sample is placed, the motorized positioning assembly comprising a motorized stage driver and at least one actuator, the at least one actuator comprising at least one of: a motorized stage actuator, a DC motor, a stepper motor, and a piezoelectric effect actuator, the motorized stage driver providing necessary electrical driving signals for the motorized stage actuators and collecting electrical signals from at least one sensor, and the at least one sensor providing information relating to a state of the motorized positioning assembly;
   a probe support rack mounted on said support platform;
   a plurality of bio-imaging probes mounted on said probe support rack with said bio-imaging probes arranged in a pre-defined geometry with respect to one another, at least one bio-imaging probe having a field of view independent of all other bio-imaging probes;
   a computer controller coupled with said motorized positioning mechanism assembly and said plurality of bio-imaging probes, said computer controller programmed with instructions for instructing said motorized positioning assembly to move said sample holder, having the tissue sample located thereon, to positions in the field of view of each bio-imaging probe where the tissue sample is individually analyzable by each of said bio-imaging probes, said computer controller comprising means for storing an imaging data from each said bio-imaging probe, and said computer controller programmed with instructions for spatially correlating imaging data of a selected volume of interest with the imaging data obtained from at least one other bio-imaging probe and storing said spatially correlated imaging data in said storing means;
   an enclosure accommodating the plurality of bio-imaging probes and motorized positioning assembly; and
   a ventilation system configured to circulate fresh air into the enclosure.

2. The modular system according to claim 1, wherein said computer controller comprises a user interface to facilitate a user obtaining, using a designated bio-imaging probe, imaging data of the tissue sample to be visually displayed and used by means for selecting a volume of interest of the tissue sample to be imaged by said at least one additional bio-imaging probe.

3. The modular system according to claim 2, wherein said user interface is configured to allow a user to select a single volume of a tissue sample to be probed by the plurality of bio-imaging probes, or to allow a user to select multiple volumes independent of one another to be probed by the plurality of bio-imaging probes.

4. The modular system according to claim 2, wherein said computer controller comprises a plurality of pre-defined algorithms that facilitate sample analysis by executing a pre-determined sequence of selections of sample volumes of interest, sample positioning steps, data acquisitions by the bio-imaging probes, and data analysis.

5. The modular system according to claim 2,
   wherein said computer controller comprises a plurality of machine learning algorithms that facilitates sample analysis by making choices of selections of sample volumes of interest, sample positioning steps, data acquisitions by the bio-imaging probes, and imaging data analysis, and wherein the choices are based on information about the tissue samples previously acquired.

6. The modular system according to claim 4, wherein said computer controller comprises a plurality of pre-defined algorithms that perform sample analysis by executing pre-determined sequence of selections of the sample volumes of interest, sample positioning steps, data acquisitions by the bio-imaging probes, and data analysis.

7. The modular system according to claim 6,
   wherein said computer controller additionally comprises a plurality of machine learning algorithms that facilitates sample analysis by making choices of selections of the sample volumes of interest, sample positioning steps, data acquisitions by the bio-imaging probes, and imaging data analysis, and
   wherein the choices are based on information about the tissue sample previously acquired.

8. The modular system according to claim 4,
   wherein said computer controller is coupled with a distant computer system,
   wherein said distant computer system comprises a user interface, and wherein said user interface is operable by a distant user operating the computer controller within the modular system, whereby the sequence of selections of the sample volumes of interest, sample positioning steps, data acquisitions by the bio-imaging probes, and data analysis are controllable.

9. The modular system according to claim 1,
wherein said computer controller is coupled with a distant computer system, and
wherein said distant computer system comprises a plurality of pre-defined algorithms that facilitate sample analysis by controlling the computer controller within the modular system,
whereby the sequence of selections of the sample volumes of interest, sample positioning steps, data acquisitions by the bio-imaging probes, and data analysis are controllable.

10. The modular system according to claim 1,
wherein said computer controller is connected to a distant computer system,
wherein said distant computer system comprises a plurality of machine learning algorithms that facilitates sample analysis by controlling the computer controller within the modular system by making choices of selections of the sample volumes of interest, sample positioning steps, data acquisitions by the bio-imaging probes, and imaging data analysis, and
wherein the choices are based on information about the tissue sample previously acquired.

11. The modular system according to claim 2, wherein said computer controller is programmed with instructions to assign imaging data acquired at a certain point in the field of view of a selected bio-imaging probe to visually displayed imaging data of the designated probe.

12. The modular system according to claim 2,
wherein said designated bio-imaging probe comprises a 3D scanner, and
wherein said computer controller is programmed with instructions to display a 3D profile on a two dimensional computer display.

13. The modular system according to claim 1,
wherein said designated bio-imaging probe comprises a 3D scanner, and
wherein said computer controller is programmed with instructions to display a 3D profile on a three dimensional computer display.

14. The modular system according to claim 12,
wherein said 3D profile comprises a surface profile of a tissue sample, and
wherein said surface profile of the tissue sample is stored by a control computer as a set of coordinates relative to said 3D scanner.

15. The modular system according to claim 12, wherein operation of said 3D scanner comprises one system of: a time-of-flight system, a triangulation system, a structured light system, a modulated light system, a stereoscopic system, and a photometric system.

16. The modular system according to claim 2, wherein said designated bio-imaging probe comprises one of a visible light camera and an infrared camera.

17. The modular system according to claim 16, further comprising a pair of lasers, each laser of the pair of lasers fixed at a predetermined geometry in relation to one another and said designated probe, wherein the pair of lasers are configured to emit respective laser beams that intersect within the field of view of the designated bio-imaging probe, and wherein said user interface is configured to receive input from a user to activate the motorized positioning mechanism to: move the sample holder, display movement of the tissue sample, and stop movement of the tissue sample when the respective laser beams intersect at a location of interest in the tissue sample, said computer controller being programmed with instructions to calculate, based on coordinates of the location of interest at a point where the two laser beams intersect, a distance to move the motorized positioning system to place the location of interest in a predetermined location within the field of view of each bio-imaging probe in order to acquire imaging data of the location of interest by each bio-imaging probe and to spatially correlate the imaging data acquired by each bio-imaging probe.

18. The modular system according to claim 1 wherein the two or more bio-imaging probes are optical probes.

19. The modular system according to claim 18 wherein said two or more optical probes are any one of a spontaneous Raman probe, an optical coherence tomography (OCT) probe, a polarization sensitive optical coherence tomography (PS-OCT) probe, fluorescent probe, stimulated Raman scattering (SRS) probe, short wavelength infrared (SWIR) camera, light microscope, coherent anti-Stokes Raman scattering (CARS) probe, hyperspectral imaging (HIS) probe, fluorescence lifetime imaging microscopy (FLIM) probe, diffuse reflectance probe, second harmonic imaging probe, and third harmonic imaging probe.

20. The modular system according to claim 18 wherein said optical probes and positioning mechanism are enclosed in an enclosure.

21. The modular system according to claim 20 wherein said enclosure is temperature controlled.

22. The modular system according to claim 1, wherein said support platform is mounted on a plurality of vibration isolators.

23. The modular system according to claim 1, wherein each bio-imaging probe of said plurality of bio-imaging probes has a field of view independent of all other bio-imaging probes.

24. The modular system according to claim 1, wherein said tissue sample comprises at least one of: human tissue, animal tissue, plant tissue, cells, and food samples,
wherein the sample holder comprises a cooling system configured to slow deterioration of the tissue sample, and
wherein the cooling system comprises a thermoelectric cooling device.

25. The modular system according to claim 20 wherein said enclosure is a light tight enclosure.

26. The modular system according to claim 20 including a ventilation system to circulate fresh air into the enclosure.

27. The modular system according to claim 2,
wherein at least one bio-imaging probe of the plurality of bio-imaging probes comprises a white light microscope providing an initial image of at least a portion of the volume of interest, and
wherein said user interface is configured to be used by said selecting means for marking, on an image on a visual display, a portion of the sample surface to be probed with at least one bio-imaging probe of the plurality of bio-imaging probes.

28. The modular system according to claim 1 wherein one of said bio-imaging probes comprises an excitation laser, and including a photosensitive material affixed to the sample stage wherein illumination by said excitation laser leaves a mark on said photosensitive material, and wherein said computer controller is programmed with instructions to register the mark on the photosensitive material with at least one other bio-imaging probe.

29. The modular system according to claim 1 including a pinhole registration device including an enclosure attached to the sample stage, said enclosure containing a photodiode and a pinhole aperture in a top surface of the enclosure located above the photodiode, and wherein said computer controller is programmed with instructions to image said pinhole with at least two optical probes by moving the pinhole registration device within fields of view of said two optical probes, and wherein the computer controller is programmed with instructions to determine positions of said pinhole relative to said optical probes by analyzing images of the pinhole acquired by said optical probes.

30. The modular system according to claim 29 where one of two optical probes incorporates an excitation laser and where the image of said pinhole is produced by said excitation laser by moving the pinhole registration device across said excitation laser beam and detecting a maximum photodiode signal, and storing a location of the pinhole registration device at the location of the detected maximum photodiode signal.

31. The modular system according to claim 1 where said sample is a biopsy tissue sample of a patient, and wherein said computer controller is programmed with instructions to store previously acquired data related to said biopsy tissue sample comprising patient identification data, spatial coordinates of a biopsy acquisition point in the anatomy of the patient, and time of the biopsy sample acquisition.

* * * * *